(12) United States Patent
Okada et al.

(10) Patent No.: US 6,190,294 B1
(45) Date of Patent: Feb. 20, 2001

(54) HORIZONTAL MACHINE TOOL

(75) Inventors: Yasuhiro Okada, Nagoya; Kengo Yoshioka, Kariya; Fumio Sakamoto, Toyota; Sentaro Sugita, Nagoya; Hidekazu Hirano, Tokoname; Takeshi Nishikayama, Kariya; Hiroyuki Takahara, Chiryu, all of (JP)

(73) Assignee: Toyoda Koki Kabushiki Kaisha, Kariya (JP)

( * ) Notice: Under 35 U.S.C. 154(b), the term of this patent shall be extended for 0 days.

(21) Appl. No.: 09/162,132

(22) Filed: Sep. 29, 1998

(30) Foreign Application Priority Data

| Sep. 30, 1997 | (JP) | 9-267321 |
| Sep. 30, 1997 | (JP) | 9-267322 |
| Sep. 30, 1997 | (JP) | 9-267323 |

(51) Int. Cl.$^7$ ............ B23Q 3/157; B23B 39/00; B23C 1/00
(52) U.S. Cl. ............ 483/30; 408/234; 409/202; 409/212; 409/235; 483/38
(58) Field of Search .......... 409/137, 134, 409/136, 190, 191, 198, 224, 235, 202, 212; 408/89, 90, 91, 234; 483/39, 40, 41, 48, 30, 31, 2, 3

(56) References Cited

U.S. PATENT DOCUMENTS

| 1,466,811 | * | 9/1923 | Thatcher | 409/137 |
| 2,757,560 | * | 8/1956 | Ridgway | 77/22 |
| 3,823,466 | * | 7/1974 | Jerue | 483/40 |
| 3,874,071 | * | 4/1975 | Kato | 29/568 |
| 4,484,387 | * | 11/1984 | Nachmany | 409/137 |
| 4,632,615 | * | 12/1986 | Yamamura | 409/235 |
| 4,651,404 | * | 3/1987 | Shorrock | 409/198 |
| 5,662,568 | * | 9/1997 | Lindem | 483/30 |
| 5,688,082 | * | 11/1997 | Richardson | 408/67 |
| 5,781,983 | * | 7/1998 | Gruner | 409/137 |
| 5,791,842 | * | 8/1998 | Sugata | 409/137 |
| 5,802,698 | * | 9/1998 | Firzgerald et al. | 409/198 |
| 5,868,606 | * | 2/1999 | Martin | 409/198 |
| 5,909,988 | * | 6/1999 | Hoppe et al. | 409/198 |

FOREIGN PATENT DOCUMENTS

| 109041 | * | 4/1989 | (JP) | 409/203 |
| 4-322937 | | 11/1992 | (JP) . | |
| 2505081 | | 5/1996 | (JP) . | |
| 10-151534 | | 6/1998 | (JP) . | |
| 626897 | * | 9/1978 | (SU) | 409/219 |

\* cited by examiner

*Primary Examiner*—William Briggs
(74) *Attorney, Agent, or Firm*—Oblon, Spivak, McClelland, Maier & Neustadt, P.C.

(57) ABSTRACT

A horizontal machine tool has a spindle head which supports a horizontal tool spindle. The spindle head is guided on a top surface portion of a base such that the spindle head is movable in two horizontal directions X and Z. A workpiece support for supporting a workpiece on its upper end is guided on the vertical front face portion of the base for movement in a vertical direction Y. When the spindle head is located at a machining position at the center in the X direction, a pair of guide portions of each of a front/back guide mechanism for the spindle head and a vertical guide mechanism for the workpiece support body take symmetrical positions with respect to a vertical plane including the axis of the tool spindle. A first index member and a second index member for supporting the workpiece are provided on the workpiece support body. Therefore, all surfaces of the workpiece excepting an attachment surface can be machined while being directed to a tool on the tool spindle. The horizontal machine tool has an automatic tool change apparatus including a tool change arm unit, a tool magazine, and an intermediate transport unit. The tool magazine is disposed on the front side of the machine tool and on one side of the workpiece support body in the X direction, and is designed such that a plurality of tools can be stored into and removed from the magazine from the front side thereof.

16 Claims, 15 Drawing Sheets

HORIZONTAL MACHINE TOOL

BACKGROUND OF THE INVENTION

1. Field of the Invention

The present invention relates to a horizontal machine tool in which a spindle head for horizontally supporting a rotatable tool spindle is guided on a first surface of a base, while a workpiece support is guided on a second surface of the base which surface is perpendicular to and adjacent to the first surface, as well as to a workpiece-support feed mechanism suitable for the horizontal machine tool. The present invention also relates an automatic tool change apparatus suitable for a horizontal machine tool having the above-described structure. The present invention further relates to a chip collection apparatus suitable for a horizontal machine tool having the above-described structure.

2. Description of the Related Art

As disclosed in Japanese Patent Application Laid-Open (kokai) No. 58-132432, in a horizontal machine tool of the above-described type, a spindle head that supports a horizontal tool spindle is guided on a first side surface of a column serving as a base to be movable in the axial direction of the tool spindle, while a workpiece support is guided on a second side surface of the column which is perpendicular to and adjacent to the first side surface in order to be movable in a vertical direction and a horizontal direction perpendicular to the tool spindle.

In another conventional machine tool disclosed in Japanese Utility Model Publication (kokoku) No. 2-26580, a spindle head that supports a horizontal tool spindle is guided on a top surface of a base such that the spindle head is movable in a direction parallel to the axis of the tool spindle as well as in a vertical direction perpendicular thereto, while a workpiece support that supports a workpiece at its upper end is guided on a front face of the base such that the workpiece support is movable in a horizontal direction perpendicular to the tool spindle.

In the former conventional machine tool, since the spindle head is guided on the first side surface in a cantilever fashion, a large difference in heat distribution is produced between that side surface and the opposite side surface, resulting in an inclination of the column. Further, since the workpiece support is guided in the vertical direction on the second side surface perpendicular to the first side surface, vertically extending guideways of the workpiece support incline by different amounts when the column inclines within a plane perpendicular to the tool spindle.

In the latter conventional machine tool, since the column is disposed on the base and the spindle head is guided in the vertical direction on the column, the overall machine height increases, which is disadvantageous for manufacture of a machine tool having a high rigidity. Further, since the workpiece support is guided on the vertical front face of the base such that the workpiece support is movable in a horizontal direction perpendicular to the tool spindle, a cover unit is horizontally disposed to extend in a direction perpendicular to a falling direction of chips in order to protect guideways for guiding the workpiece support from chips. Therefore, the cover unit hinders discharge of chips. In addition, there must be employed a telescopic cover unit or the like, which is not necessarily suitable for high speed feed of a movable member.

Meanwhile, in order to shorten tool exchange time, numerous improvements have been made in relation to automatic tool change apparatuses used in machine tools. For example, a cam mechanism as disclosed in Japanese Patent Application Laid-Open (kokai) No. 5-104377 has been employed as a drive mechanism for driving a tool change arm in order to produce advance/retraction motion and rotational motion of the tool change arm as a continuous motion to thereby increase the tool change speed.

Another approach for shortening tool change time is shortening a tool change arm in order to increase the speed of rotational motion of the tool change arm, as disclosed in Japanese Patent Application Laid-Open (kokai) No. 8-39381. In this conventional technique, the tool change arm is shortened through a decrease in the inter-axis distance between the tool spindle and a socket that holds a new tool when a tool change operation is performed. In the technique disclosed in the publication, in order to decrease the inter-axis distance between the tool spindle and the socket, an arm support shaft for supporting the tool change arm and an arm drive shaft which is rotated and axially moved by means of a cam-type drive mechanism and which transmits these motions to the arm support shaft are arranged to be parallel to each other and separated from each other in the vertical direction. Thus, a support section adapted to support the arm support shaft and positioned between the spindle head and a tool magazine during a tool change operation has a reduced width in a direction connecting the tool spindle and the magazine. The above-described structure enables a housing section that accommodates the arm drive shaft and the cam-type drive mechanism to have a width greater than that of the support section, as in conventional machine tools.

Further, a conventional automatic tool change apparatus is provided with a tool magazine which is disposed such that when a spindle head is returned to a tool change position defined at the rear side of the machine tool, the tool magazine is located adjacent to the spindle head. The tool magazine stores a plurality of tools such that the tools are directed to a direction parallel to or perpendicular to the tool spindle.

In the conventional tool change apparatus disclosed in Japanese Patent Application Laid-Open No. 8-39381, the relatively narrow support portion for supporting the arm support,shaft and the relatively wide drive section which accommodates the arm drive shaft and the cam-type drive mechanism must be separated from each other in the vertical direction. Therefore, the structure of the tool change arm unit becomes complex, and cost of manufacture increases.

Moreover, in a horizontal machine tool, a chip collection apparatus utilizing a chip conveyor has been conventionally used.

As disclosed in, for example, Japanese Patent Application Laid-Open (kokai) No. 6-247523, such a chip collection apparatus is constructed such that a chip inlet for collecting chips is formed in a bed on which a machine tool table and a main spindle are placed, and a chip conveyor is disposed under the chip inlet.

The chip conveyer has an endless chain that is wound around a pair of sprockets. The endless chain is caused to travel by means of a motor attached to one of the sprockets, so that chips falling down from the chip inlet are discharged to a chip collection box disposed behind the bed.

However, the chip collection apparatus utilizing a chip conveyor requires a large number of parts such as an endless chain and sprockets. Further, such a chip collection apparatus is built in the bed or disposed under the bed for use, the height of the bed increases, and maintenance and management of the chip collection apparatus are difficult.

SUMMARY OF THE INVENTION

A main object of the present invention is to provide a highly rigid horizontal machine tool in which a guide mechanism for a workpiece support does not hinder free fall of chips and which has a reduced overall height.

Another object of the present invention is to provide a precision horizontal machine tool in which neither the accuracy of a guide mechanism for guiding a spindle head that supports a tool spindle nor the accuracy of a guide mechanism for guiding a workpiece support are adversely affected by thermal deformation of a base.

Still another object of the present invention is to provide a horizontal machine tool in which all portions of a workpiece other than a mounting surface can be machined by use of a tool, and power supply lines or fluid supply pipes connected to a mechanism for adjusting the orientation of a workpiece relative to the tool are not damaged during machining operation.

Yet another objection of the present invention is to provide a horizontal machine tool in which chips can be collected to a relatively narrow area by free fall of the chips, thus facilitating discharge of chips to the outside of the machine tool.

A further object of the present invention is to provide a horizontal machine tool in which invasion of chips into the guide mechanism and the feed mechanism for the workpiece support is reliably prevented through use of a simple seal structure.

Still another object of the present invention is to provide a simple tool change apparatus which has a shortened tool change arm in order to shorten tool change time.

In the above-described tool change apparatus in which a tool magazine is disposed such that when a spindle head is returned to a tool change position defined at the rear of the machine tool, the tool magazine is located adjacent to the spindle head, an operator must move from the front of the machine tool to a side of the machine tool when changing tools stored in the tool magazine. In an automatic machining system in which many machine tools are installed at narrow intervals, an operator must enter a narrow space between adjacent machine tools in order to change tools stored in the tool magazine. Such tool change work involves danger. Further, in an automatic machining system in which a self-propelled vehicle having a mechanism for supplying tools to the tool magazine of each machine tool is caused to travel in front of many machine tools, the travel path of the self-propelled vehicle becomes complex, and the structure of the tool supply mechanism also becomes complex.

Accordingly, a further object of the present invention is to provide a tool change apparatus which allows an operator or a tool supply mechanism on a self-propelled vehicle to attach tools to a tool magazine or remove tools therefrom from the front side of the machine tool.

Briefly, in a horizontal machine tool according to the present invention, a spindle head which supports a tool spindle to be rotatable about a horizontal axis is guided on a top surface portion of a base such that the spindle head is movable in a first horizontal direction perpendicular to the axis of the tool spindle and in a second horizontal direction parallel to the axis of the tool spindle. Further, the base has a vertical front face portion that extends from the front side of the base and has an upper surface lower than the top surface portion of the base. A workpiece support having a workpiece attachment portion at a position above the top surface portion of the base is guided by the vertical front face portion in a vertically movable manner.

By virtue of the above-described structure, there can be decreased the width in the horizontal direction of a guide mechanism for guiding vertical movement of the workpiece support, so that a space that allows free fall of chips can be secured on either side of the workpiece support. Also, since the workpiece support is supported by the vertical front face portion of the common base which guides movement of the spindle head in two horizontal directions, the rigidity of the machine tool is improved. Moreover, the rigidity of the machine tool can be improved through a decrease in the overall height of the machine tool.

Further, first and second guide mechanisms for guiding movement of the spindle head in first and second horizontal directions, and a third guide mechanism for guiding vertical movement of the workpiece support are constructed such that they exist symmetrically with respect to a vertical plane including the axis of the tool spindle when the spindle head is located at an approximate longitudinal center of the first guide mechanism. This structure mitigates adverse effect of thermal deformation of the base on machining accuracy of workpieces.

Preferably, the workpiece support is composed of a support body that is fed vertically by means of the third feed mechanism; a first index member that is rotated and indexed, on the support body, about a vertical axis; and a second index member that is rotated and indexed, on the first index member, about a horizontal axis perpendicular to the vertical axis.

This structure enables five surfaces of a workpiece, or all surfaces other than an attachment surface, to be machined while being directed to a tool attached to the tool spindle. Further, since the first and second index members are provided on the support body which moves only in the vertical direction, wires and the like connected to actuators for driving the first and second index members dangle due to gravity, so that the wires and the like hardly cause sliding contact with other stationary portions while the support body moves vertically. Thus, there can be avoided damage to the wires which would otherwise frequently occur in the case of a conventional structure in which an index member is provided on a horizontally movable member which is moved repeatedly.

Further, a front member is preferably provided at the front of the base. The front member and the base form a chip collecting space on at least one side of the workpiece support such that the chip collecting space is gradually narrowed downward, thereby forming a V-shaped cross section.

This structure allows chips generated during machining operation to freely fall to be collected at a narrow bottom portion of the V-shaped space formed on at least one side of the workpiece support. Therefore, if an apparatus for forcedly discharging chips is provided at the bottom portion, discharge of chips to the outside of the machine tool can be performed efficiently.

The present invention also provides a workpiece-support feed mechanism suitable for the above-described horizontal machine tool. The workpiece-support feed mechanism comprises at least two bearing blocks fixed to the vertical front face portion of the base such that the bearing blocks are spaced in a transverse direction; a pair of linear rails guided by the bearing blocks for vertical movement; a workpiece support body fixed to the linear rails and having a cylindrical portion at its upper end, where a vertical plane including the attachment surface of said linear rails passes through the approximate center of the cylindrical portion; and a vertical feed mechanism including a feed screw that extends vertically on the side opposite the bearing blocks with respect to the workpiece support body and is adapted to vertically feed the workpiece support.

By virtue of the above-described structure, the vertical guide mechanism and the drive mechanism of the workpiece support body can be reliably isolated from the chip collecting space through employment of an annular seal member in sliding contact with the cylindrical portion. Further, since the vertical feed mechanism is disposed on the front side of the machine opposite the vertical guide mechanism, assembly and maintenance work are facilitated.

The present invention further provides an automatic tool change apparatus suitable for the above-described horizontal machine tool, The automatic tool change apparatus has a tool change arm unit for exchanging a tool on a tool spindle with a tool that has been taken out of a tool magazine by use of an intermediate transport unit. The tool change arm unit includes an arm shaft supported by a housing, a tool change arm attached to one end of the arm shaft projecting from the housing and having a tool gripping portion at either end, and a drive mechanism disposed within the housing and adapted to rotate and axially move the arm shaft. The tool change arm unit is disposed such that the arm shaft becomes parallel to the tool spindle and that the housing is located on the front side, in the axial direction, of the tool spindle of the spindle head located at the tool change position.

In the above-described structure, the housing which accommodates the drive mechanism and therefore has a relatively large width is disposed on the front side of the tool spindle located at the tool change position. Therefore, there can be decreased the inter-axis distance between the tool on the tool spindle located at the tool change position and the tool on the intermediate transport unit, so that there can be used a short change-arm that can be rotated at high speed.

Preferably, the tool change arm unit is fixedly disposed on the base such that the housing of the tool change arm unit becomes parallel to the workpiece support, which is movable in a direction perpendicular to the moving direction of the spindle head and perpendicular to the axis of the tool spindle. This structure always secures a predetermined distance between the workpiece support and the tool change arm unit to thereby prevent the tool change arm from hindering machining operation. Thus, there can be eliminated drawbacks involved in the case where a tool change arm unit is disposed on the workpiece support.

More preferably, the machine tool is constructed such that the spindle head that horizontally supports the tool spindle is guided on the upper surface portion of the base to be movable in a first horizontal direction perpendicular to the axis of the tool spindle and in a second horizontal direction parallel to the axis of the tool spindle, and the workpiece support is guided by the vertical front face portion of the base to be vertically movable in a third direction perpendicular to both the first and second directions, and such that the tool change arm unit is disposed in such a manner that the housing of the tool change arm unit and the tool magazine are disposed on the front side of the tool spindle and parallel to the workpiece support on one side thereof in the first direction.

This structure decreases the overall height of the machine tool including the automatic tool change unit and enables proper arrangement of the machine tool in a mass-production plant. In addition, since the tool magazine is disposed on the front side of the machine tool and is parallel to the workpiece support, supply of tools to be stored into the tool magazine and removal of old tools from the tool magazine can be performed from the front side of the machine tool.

Preferably, a plurality of tools are held in the tool magazine such that the tools are parallel to and oriented in the same direction as is a tool attached to the tool spindle, and the intermediate transport unit is constructed such that the tools can be taken out of or returned to the tool magazine from the rear side of the tool magazine. In the above-described structure, the intermediate transport unit does not have to be constructed such that the tools are taken out of or returned to the tool magazine from the front side of the tool magazine. Therefore, there can be simplified the structure of the intermediate transport unit, which transports a tool between the tool magazine provided at the front side of the machine tool and a tool change position that is located behind the tool magazine and in a plane in which the tool change arm rotates.

Preferably, the intermediate transport unit includes a socket which can removably hold a tool in the same manner as in the case where a tool is attached to the tool spindle; a transverse positioning mechanism for moving the socket in the transverse direction of the machine tool; a vertical positioning mechanism disposed on the transverse positioning mechanism and adapted to move the socket in the vertical direction; and a front/back positioning mechanism disposed on the vertical positioning mechanism and adapted to move the socket in the front/back direction between the position corresponding to the position of the tool magazine and the tool change position, which is located behind the tool magazine and in a plane in which the tool change arm rotates.

By virtue of the above-described structure, attachment of the intermediate transport unit can be performed through a simple operation of attaching the transverse positioning mechanism to a support member therefor. In addition, when the intermediate transport unit is used in combination with a tool magazine having a narrow width in the transverse direction, the positioning mechanisms are superposed in ascending order of socket moving distance. Therefore, each positioning mechanism can operate smoothly.

Preferably, the tool change arm unit, the tool magazine, and the intermediate transport unit of the tool change apparatus are fixed to a single substrate so that the entire tool change apparatus is assembled as a single unit. Therefore, during assembly, relative positioning between the machine tool body and the tool change apparatus can be effected through a simple operation of positioning the substrate relative to the machine tool body.

The present invention further provides a chip collection apparatus suitable for the above-described horizontal machine tool. The chip collection apparatus comprises a chip collection member, a chip suction apparatus, and a chip collection bin. The chip collection member defines a chip collecting space which surrounds the workpiece support and whose cross-sectional area gradually decreases. The chip collection member has a chip suction port formed in the vicinity of the bottom of the chip collecting space. The chip suction apparatus is provided at the chip suck opening and adapted to suck the chips by action of air. The chip collection bin collects the chips sucked by the chip suction apparatus.

This structure enables collection of chips without requiring large scale machining within the base. Further, the height of the base can be decreased through simplification of the apparatus for chip collection in order to reduce the size of the machine tool.

Preferably, there is further provided a chip suction apparatus which comprises a movable cover which is attached to the spindle head in order to cover the tool spindle and is movable in the advancement/retraction direction of the spindle head; and movable cover control means for controlling the movement of the movable cover based on the amount of movement of the spindle head in the advancement/retraction direction.

Preferably, the movable cover is formed such that it surrounds a tool attached to the tool spindle and is moved in accordance with relative movement between the spindle head and the workpiece support in the advancement/retraction direction. In this case, the distance between the periphery of a workpiece and the movable cover can be maintained constant, so that collection of chips can be performed in an optimum manner without causing interference between the tool and the movable cover or between the workpiece and the movable cover.

More preferably, during machining of a workpiece, the movable cover control means controls the movement of the movable cover such that a predetermined clearance is maintained between the movable cover and the front face of the workpiece regardless of the length of a tool held in the tool spindle and movement of the spindle head in the advancement/retraction direction. Therefore, at the time of tool change operation, the movable cover can be moved to a withdrawn position.

The movable cover is preferably controlled such that the movable cover is also moved in accordance with a length of a tool attached to the tool spindle. In this case, collection of chips can be preformed in an optimum manner without causing interference between the tool and the movable cover or between the workpiece and the movable cover even in a machine tool in which many types of tools are selectively attached to the tool spindle.

Preferably, a heat exchange member is provided at the outer circumference of a control box, and air that has been used to suck chips is jetted against the heat exchange member in order to cool the interior of the control box. In this case, cooling fans for cooling the control box can be decreased in number or completely eliminated.

BRIEF DESCRIPTION OF THE ACCOMPANYING DRAWINGS

Various other objects, features and many of the attendant advantages of the present invention will be readily a appreciated as the same becomes better understood by reference to the following detailed description of the preferred embodiments when considered in connection with the accompanying drawings, in which.

DETAILED DESCRIPTION OF THE PREFERRED EMBODIMENTS

Embodiments of the present invention will now be described with reference to the drawings.

Figure 2:
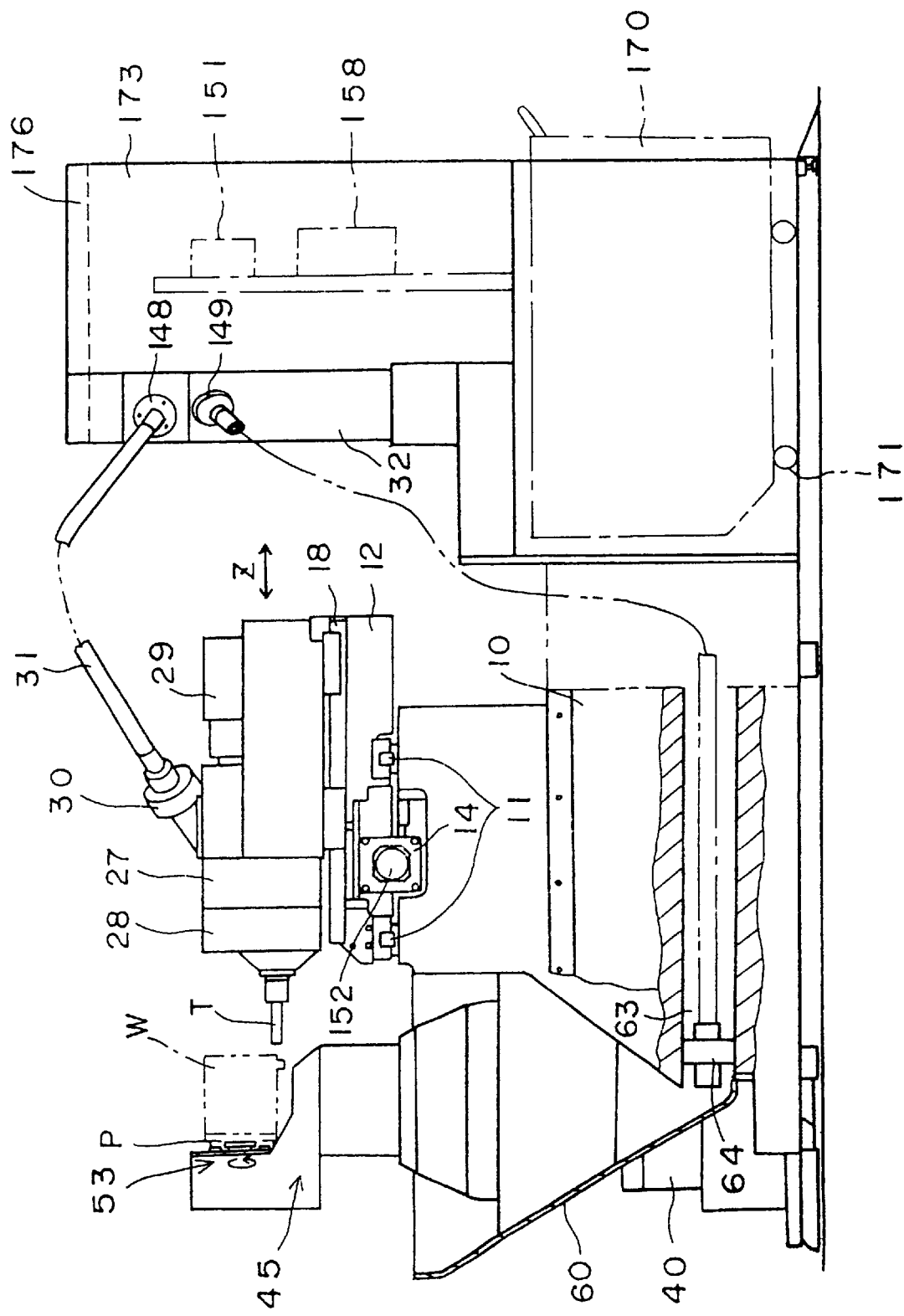
FIG. 2 is a schematic right side view of the machine tool, showing a chip collection apparatus.
Figure 3:
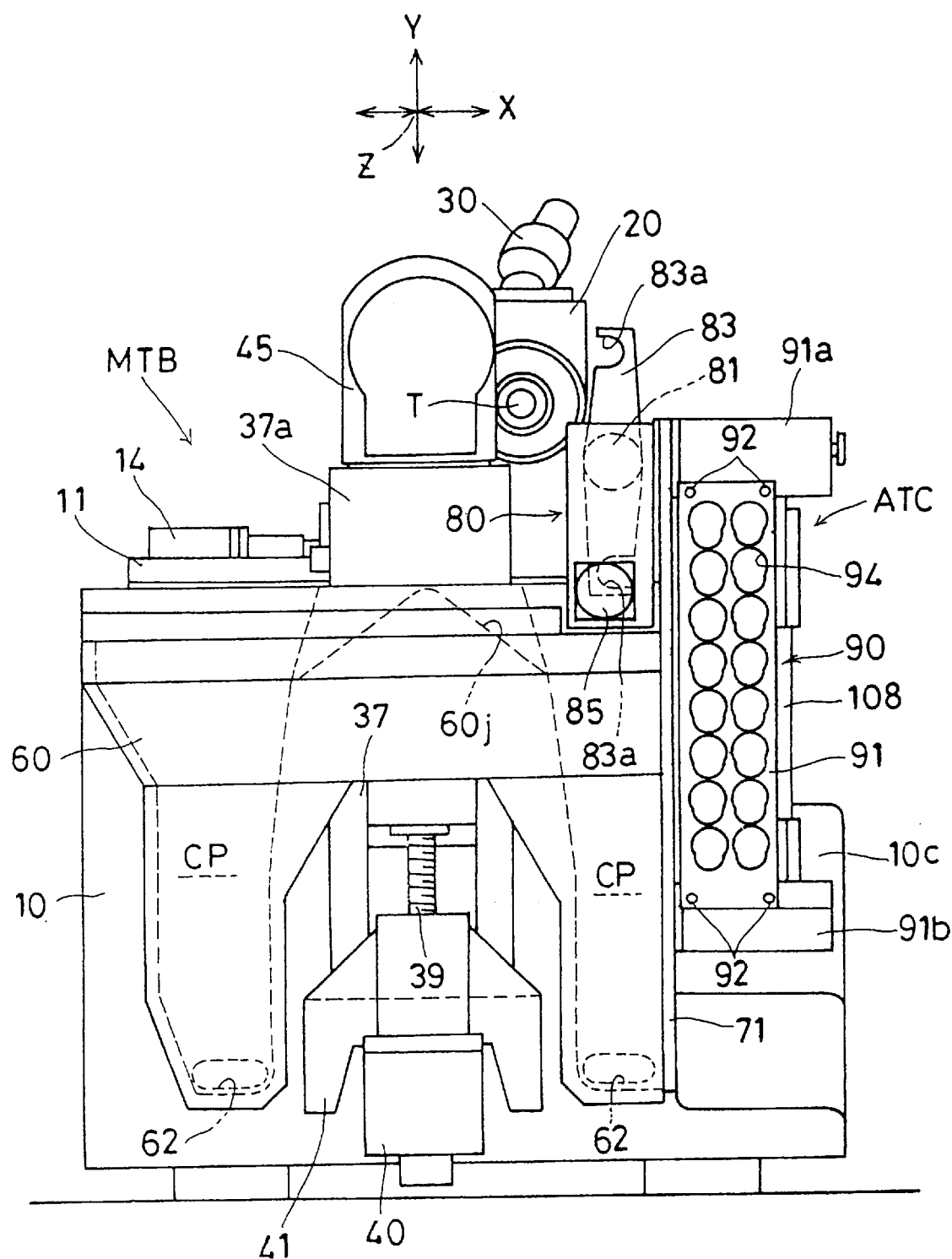
FIG. 3 is a front view of the machine tool.
Figure 4:
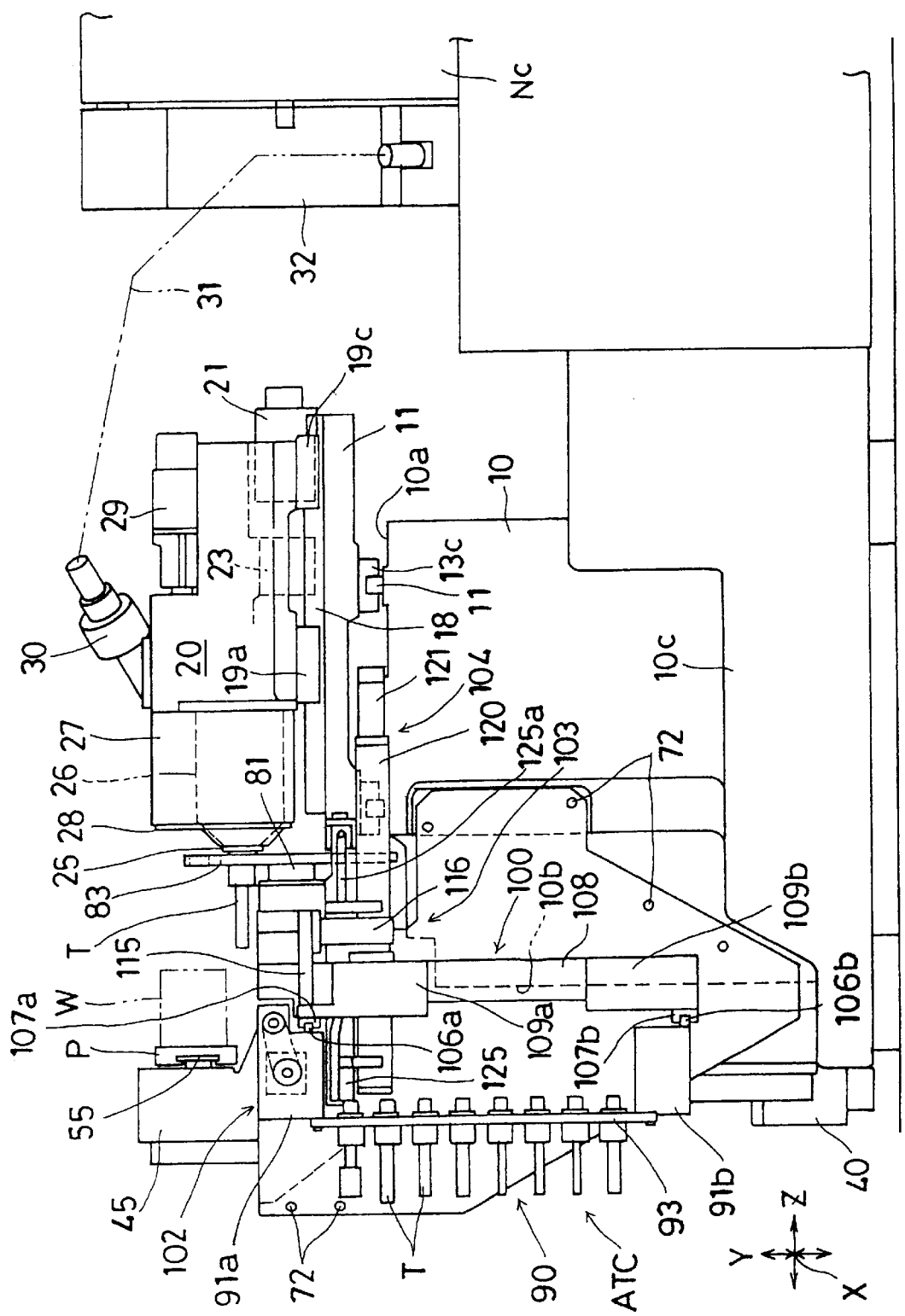
FIG. 4 is a right side view of the machine tool.

In FIGS. 1–4, which respectively show a plan view, a right side view, a front view, and another right side view of a horizontal machine tool according to an embodiment of the present invention, numeral 10 denotes a base of a machine body MTB. The base 10 is composed of a block portion and an auxiliary device attachment portion 10c. The block portion has a rectangular shape such that the length in the front/back direction is slightly longer than the length in the transverse direction and is adapted to guide a movable member, which will be described later. The auxiliary device attachment portion 10c is formed integrally with the block portion, shown on the right side in FIG. 1, in order to allow auxiliary devices of the machine tool to be mounted thereon. As best seen in FIG. 4, the height of the auxiliary device attachment portion 10c decreases stepwise from the rear portion toward the front portion. In a case where the auxiliary devices of the machine tool are installed on the floor, the auxiliary device attachment portion 10c is unnecessary. Accordingly, in the following description, the block portion is referred to as the "base 10" unless specific reference is made to the auxiliary device attachment portion 10c.

On the top surface portion 10a of the base 10 are fixedly disposed a pair of guide rails 11. The guide rails 11 are separated from each other in a Z-axis direction, which is the front/back direction of the machine tool, and extend in a horizontal X-axis direction perpendicular to the Z-axis direction. Bearing blocks 13a–13d which travels along the guide rails 11 are fixed to the bottom surface of an X-axis slide 12. Thus, the X-axis slide 12 is guided to be movable in the X-axis direction along the guide rails 11. A servomotor 14 fixedly disposed on the base moves the X-axis slide 12 in the horizontal X-axis direction via a feed screw 15 and a nut 15a (see FIG. 6) fixed to the bottom surface of the X-axis slide 12.

An encoder 152 is mechanically connected to the rear end of the X-axis servomotor 14 and electrically connected to a numerical controller NC via an unillustrated servo amplifier.

On the X-axis slide 12 are fixedly provided a pair of guide rails 18 disposed perpendicular to the guide rails 11. Specifically, the guide rails 18 are separated from each other in the X-axis direction and extend in the horizontal Z-axis direction. A spindle head 20 is guided by the guide rails 18 via bearing blocks 19a–19d fixed to the bottom surface of the spindle head 20 at the four corners thereof, so that the spindle head 20 can travel along the guide rails 18.

As shown in FIG. 4, a servomotor 21 is fixedly disposed on the X-axis slide 12 to be located between the guide rails 18. The servomotor 21 moves the spindle head 20 in the Z-axis direction via an unillustrated feed screw and a nut 23 fixed to the bottom surface of the spindle head 20. An encoder 151 is mechanically connected to the rear end of the servomotor 21 and electrically connected to the numerical controller NC via a Z-axis servo amplifier 153. The Z-axis servo amplifier 153 controls the rotation of the Z-axis servomotor 21 on the basis of a difference between a target position indicated by a target position command of an NC program stored within the numerical controller NC and a present position indicated by a present position signal from the encoder 151 in order to move the spindle head 20 to the target position.

Also, an encoder 138 is connected to the numerical controller NC via a servo amplifier 155. Further, a sequence controller 158 is connected to the numerical controller NC. The sequence controller 158 performs on-off control for a solenoid valve 144 and the like. The NC controller NC stores therein a NC program as well as tool data such as tool lengths of tools T stored in the tool magazine 90.

Figure 11:
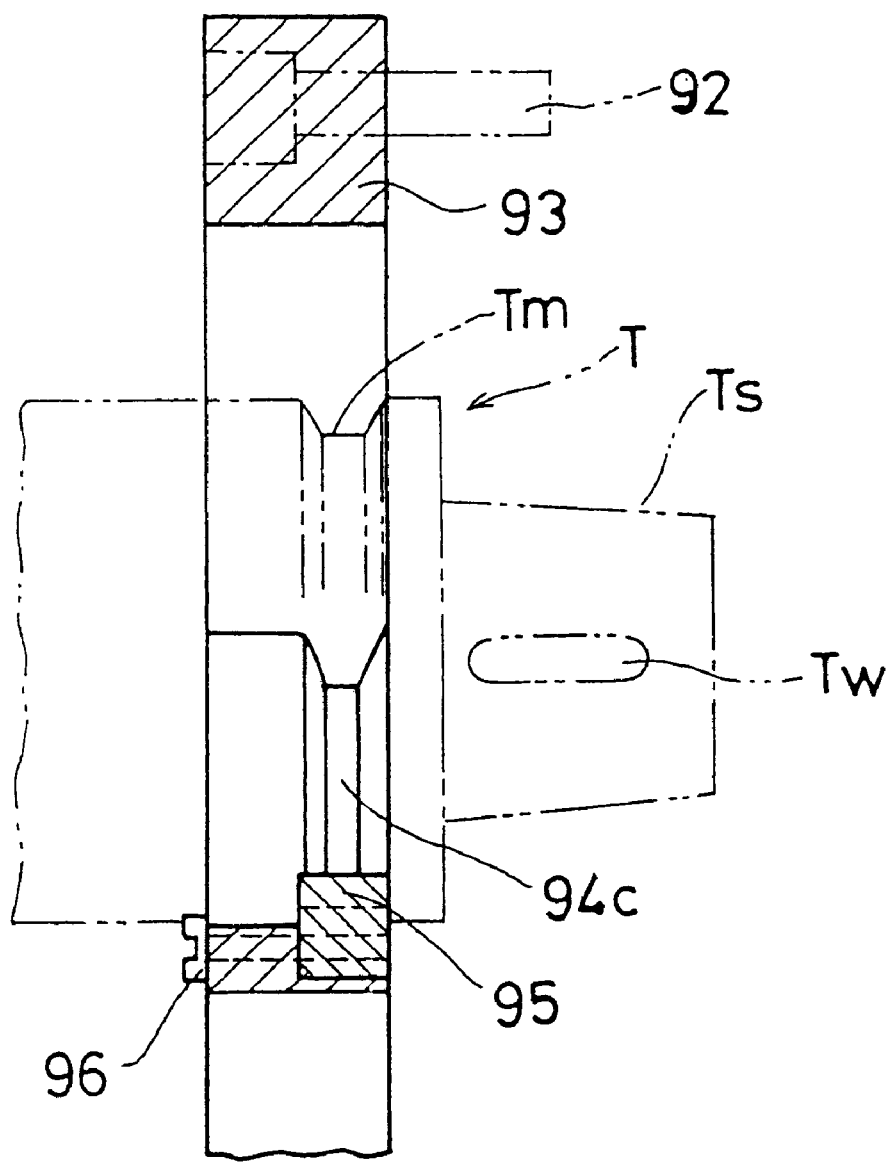
FIG. 11 is a cross section taken along the line B—B in FIG. 10.

The spindle head 20 supports a tool spindle 25 at the center between the pair of guide rails 18 such that the tool spindle 25 is rotatable about a horizontal axis extending in the Z-axis direction. At the front end of the tool spindle 25 are provided a tool reception hole and a clamp mechanism (both unillustrated) for removably receiving and fixing a tapered shank Ts of a tool T as shown in FIG. 11. The outer circumference of a spindle housing 26 which surrounds and journals the front end portion of the tool spindle 25 has a generally cylindrical shape. A stationary cover 27 for collecting chips is disposed to surround the outer circumference of the housing 26 with a predetermined annular space formed therebetween and is fixed to the spindle head 20. Disposed within the stationary cover 27 is a movable cover 28 that telescopically expands and contracts. The movable cover 28 is connected via a feed screw 135 and a nut mechanism 133 to a servomotor 29 fixedly disposed on the spindle head 20, so that the servomotor 29 can control the position of the movable cover 28. More specifically, the movable cover 28 is fixedly supported on rods 131, which are advanced and retracted within a pair of through-holes 130 formed in the spindle head 20 along the tool spindle 25.

Portions of the outer circumferences of the rods 131 are fixed to opposite ends of a V-shaped bracket 132, and a ball nut 133 is attached to the central portion of the bracket 132. The ball nut 133 is in screw-engagement with a ball screw 135 within a space portion 134 of the spindle head 20. The ball screw 135 is connected to the output shaft of the servomotor 29 via a floating nut 136.

When the servomotor 29 is driven, the ball screw 135 is rotated through the floating nut 136. With rotation of the ball screw 135, the rods 131 are moved via the ball nut 133 in screw-engagement with the ball screw 135. Thus, the bracket 132 fixed to the rods 131 is moved to advance and retract the movable cover 28. Further, an encoder 138 fixed onto the top surface of the spindle head 20 is connected to the rear end of the servomotor 29.

A chip suction apparatus 30 is disposed on the spindle head 20. The chip suction apparatus 30 creates negative pressure within the covers 27 and 28 in order to suck chips and feed them to a dust collector 32 disposed at the rear of the machine tool via a flexible pipe 31. More specifically, the chip suction apparatus 30 has a chip suction port 140, a chip discharge port 141, and an air suction port 142, and the chip suction port 140 communicates with the interior of the movable cover 28 via a suction passage 143 formed in the spindle head 20.

The air suction port 142 is connected to an air pump 145 via a solenoid valve 144, and as shown in FIG. 2, the chip discharge port 141 is connected to the dust collector 32 disposed on the rear side of the spindle head 20 via the flexible pipe 31. The chip suction apparatus 30 is designed such that air supplied from the air suction port 142 creates a negative pressure in the vicinity of the chip suction port 140 while flowing toward the chip discharge port 141, so that air is sucked from the chip suction port 140 by action of the thus-generated negative pressure.

Figure 6:
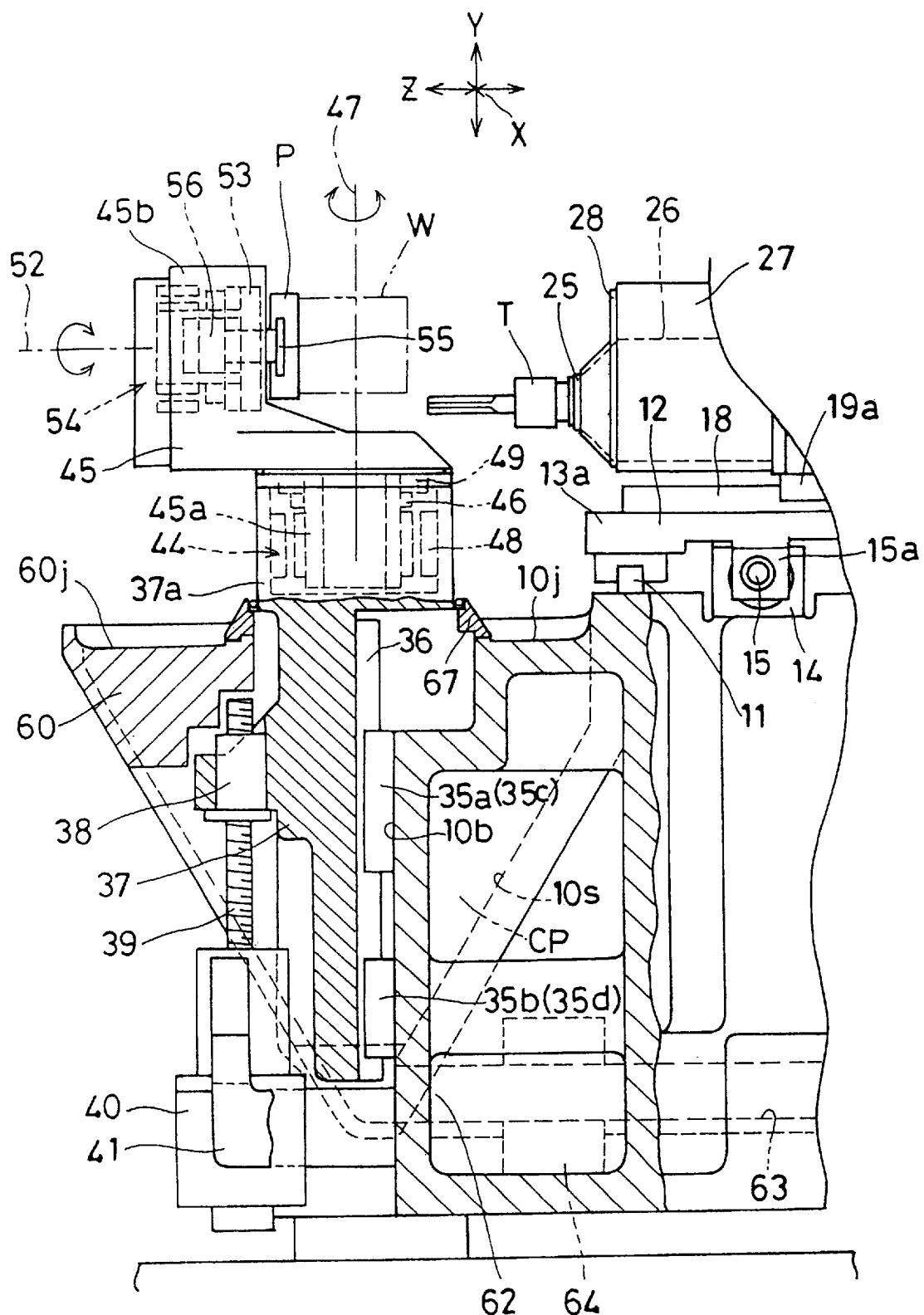
FIG. 6 is an enlarged vertical cross section taken along the line A—A in FIG. 1.
Figure 7:
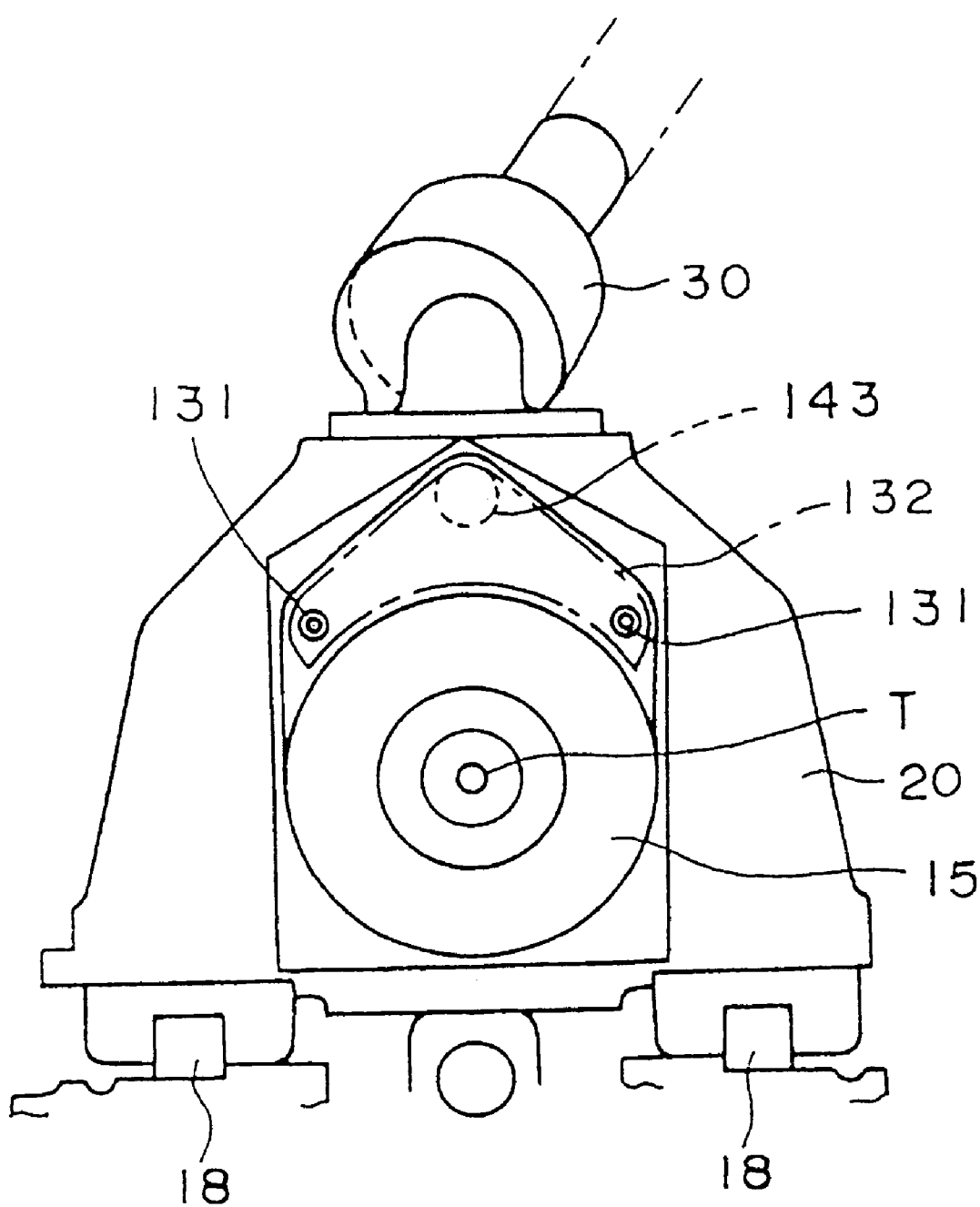
FIG. 7 is a front view of the spindle head.

As shown in FIG. 6, the base 10 has a vertical front face portion 10b formed at its central portion in the transverse direction (X-axis direction). Four bearing blocks 35a–35d are fixedly attached to the vertical front face portion 10b. That is, paired upper and lower block bearings 35a and 35b are disposed at a right-side position and paired upper and lower block bearings 35c and 35d are disposed at a left-side position that is separated from the right-side portion in the X-axis direction. Right and left guide rails 36 are guided by means of the block bearings 35a–35d for movement in the Y-axis direction, which is the vertical direction. The right and left guide rails 36 are fixed to a surface of a workpiece support body 37 facing the vertical front face portion 10b. In order to minimize influence of thermal deformation of the base 10, the guide rails 36 are disposed symmetrically with respect to a vertical plane that includes the horizontal axis of the tool spindle 25 when the spindle head 20 is positioned on the top surface portion 10a of the base 20 at a center position in the right/left direction (X-axis direction).

A nut 38 is fixed to the front face of the workpiece support body 37 opposite the surface to which the guide rails 36 are attached. A feed screw 39 in screw-engagement with the nut 38 is rotated by a servomotor 40 equipped with a reduction gear mechanism. The servomotor 40 is fixed to the top portion of an arch-shaped bracket 41 whose opposite leg portions are fixed to the vertical front face portion 10b of the base 10. When the motor 40 is driven, the workpiece support body 37 is moved in the Y-axis direction, so that the workpiece W which moves vertically together with the workpiece support body 37 is positioned three-dimensionally in relation to the tool T attached to the tool spindle 25, which is horizontally moved on the top surface portion 10b in the X-axis and Z-axis directions perpendicularly intersecting each other.

At the upper end of the workpiece support body 37 is formed a cup portion 37a which has a cylindrical outer circumference and which accommodates a first index mechanism 44 within its cylindrical inner space. The index mechanism 44 comprises a hollow shaft 45a, a bearing 46, and a built-in servomotor 48 for index operation, all of which are accommodated within the cylindrical space. The hollow shaft 45a extends downward from the bottom surface of an L-shaped first index member 45 and is coaxial with the cylindrical space. The bearing 46 supports the hollow shaft 47 such that the hollow shaft 47 can be rotated about a vertical axis 47 for index operation. The built-in servomotor 48 is composed of a stator coil fixed to the inner surface of the cup portion 37a to be located below the bearing 46 and a rotor fixed to the outer circumference of the hollow shaft 45a. A clamp ring 49 is interference-fitted onto the outer circumference of the hollow shaft 45a at a position above the bearing 46. When pressurized oil is introduced into the clamp ring 49, the clamp ring 49 increases its inner diameter in order to allow the first index member 45 to be indexed by means of the motor 48.

An offset vertical portion 45b of the L-shaped first index member 45 contains therein a disk-shaped second index member 53, which can be rotated and indexed about a horizontal axis 52 perpendicularly intersecting the vertical rotational axis 47 of the first index member 45 in a vertical plane common thereto. The vertical portion 45b includes therein a second index mechanism 54 whose structure is similar to that of the first index mechanism 44, in order to rotate the second index member 53 for indexing and positioning. A T-shaped clamp 55 is provided in order to clamp a pallet P for supporting the workpiece W. The clamp 55 has a horizontal shaft portion at its center, and the horizontal shaft portion is connected to a hydraulic cylinder 56 built in the cylindrical shaft portion of the second index member 53. The clamp 55 is positioned at a clamp position and an unclamp position by operation of the cylinder 56.

When the clamp 55 is located at the unclamp position in a state in which the longitudinal direction of the clamp 55 coincides with the horizontal X-axis direction, the pallet P which supports the workpiece W is loaded such that the clamp 55 is inserted into a T-slot of the pallet P. When the clamp 55 is moved to the clamp position, the bottom surface of the pallet P is seated on unillustrated seat pieces provided on the second index member 53, so that the pallet P is supported by and clamped on the second index member 53. Thus, through proper combination of operation of the first index mechanism 44 and operation of the second index mechanism 54, all the surfaces of the workpiece W, other than the surface for attachment on the pallet P, can be caused to face the tool T attached to the tool spindle 25 in order to be machined thereby.

Through a cylindrical space extending axially within the hollow shaft 45a of the first index mechanism 44 are passed unillustrated wires for supplying electricity to the built-in motor of the second index mechanism 54, unillustrated supply pipes for supplying oil to an unillustrated diameter-increasing fluid chamber of the clamp ring 49 for the first and second index mechanisms 44 and 54, and unillustrated supply and discharge pipes connected to the hydraulic cylinder 56 for operating the clamp 55. These wires and pipes are taken out through an unillustrated takeout opening opened to a side surface of the workpiece support body 37 and extending downward. Since the support body 37 moves only in the vertical direction, there can be eliminated damage of the wires and pipes, which damage tends to frequently occur due to sliding contact with a stationary portion if wires and pipes are taken out from a horizontally moving member.

On the right and left sides of the vertical front face portion 10b of the base 10, a slant surface 10s is formed from the top surface toward the bottom surface of the base 10, except at the left end surface portion 10g. Further, a bridge portion 10j is provided at the front upper portion of the base 10 such that the bridge portion 10j extends in the front/back direction at the center of the vertical front face portion 10b, and the opposite side surfaces of the bridge portion 10j are inclined such that the distance between the side surfaces increases from the upper portion toward the lower portion of the bridge portion 10j and the side surfaces are joined with the above-described inclined surfaces 10s.

Figure 1:
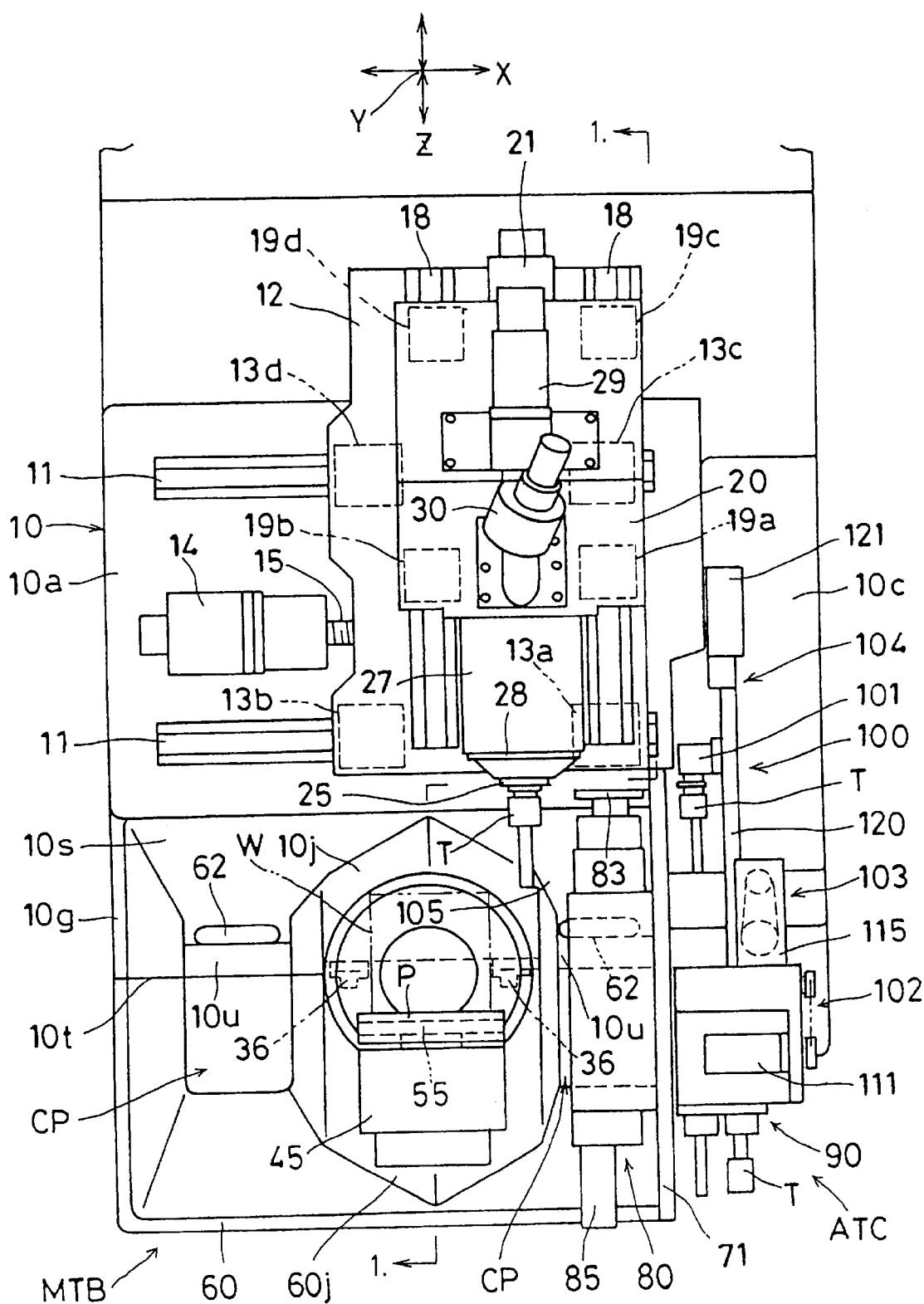
FIG. 1 is a plan view of a machine tool according to an embodiment of the present invention.

As is understood from FIG. 1, at the front face of the base 10 is formed a joint surface 10t which extends in the right/left direction while passing through the center of the cup portion 37a of the workpiece support body 37. More specifically, on the left side of the cup portion 37a, the joint surface 10t includes the respective frontmost faces of the left end surface portion 10g, the inclined surface of the bridge portion 10j located on the left side of the cup portion 37a, and a horizontal bottom portion 10u of the base 10 between the left end surface portion 10g and the left-side inclined surface of the bridge portion 10j. On the right side of the cup portion 37a, the joint surface 10t includes the respective frontmost faces of the inclined surface of the bright portion 10j located on the right side of the cup portion 37a and a horizontal bottom portion 10u formed at the lower end of the inclined surface 10s.

Through use of a plurality of unillustrated bolts, a front member 60 is removably fixed to the base 10 in such a manner that the front member 60 butts the above-described joint surface 10t. Specifically, the front member 60 has portions that correspond to and come into surface contact with the left end surface portion 10g, the left-side inclined portion 10s, the horizontal bottom portion 10u extending from the left-side inclined portion, the central bridge portion 10j, the right-side inclined portion, and the horizontal bottom portion 10u extending from the right-side inclined portion. By virtue of the above structure, as shown in FIG. 6, a V-shaped chip collecting space CP is formed on either side of the central bridge portion 10j in the right/left direction.

Figure 12:
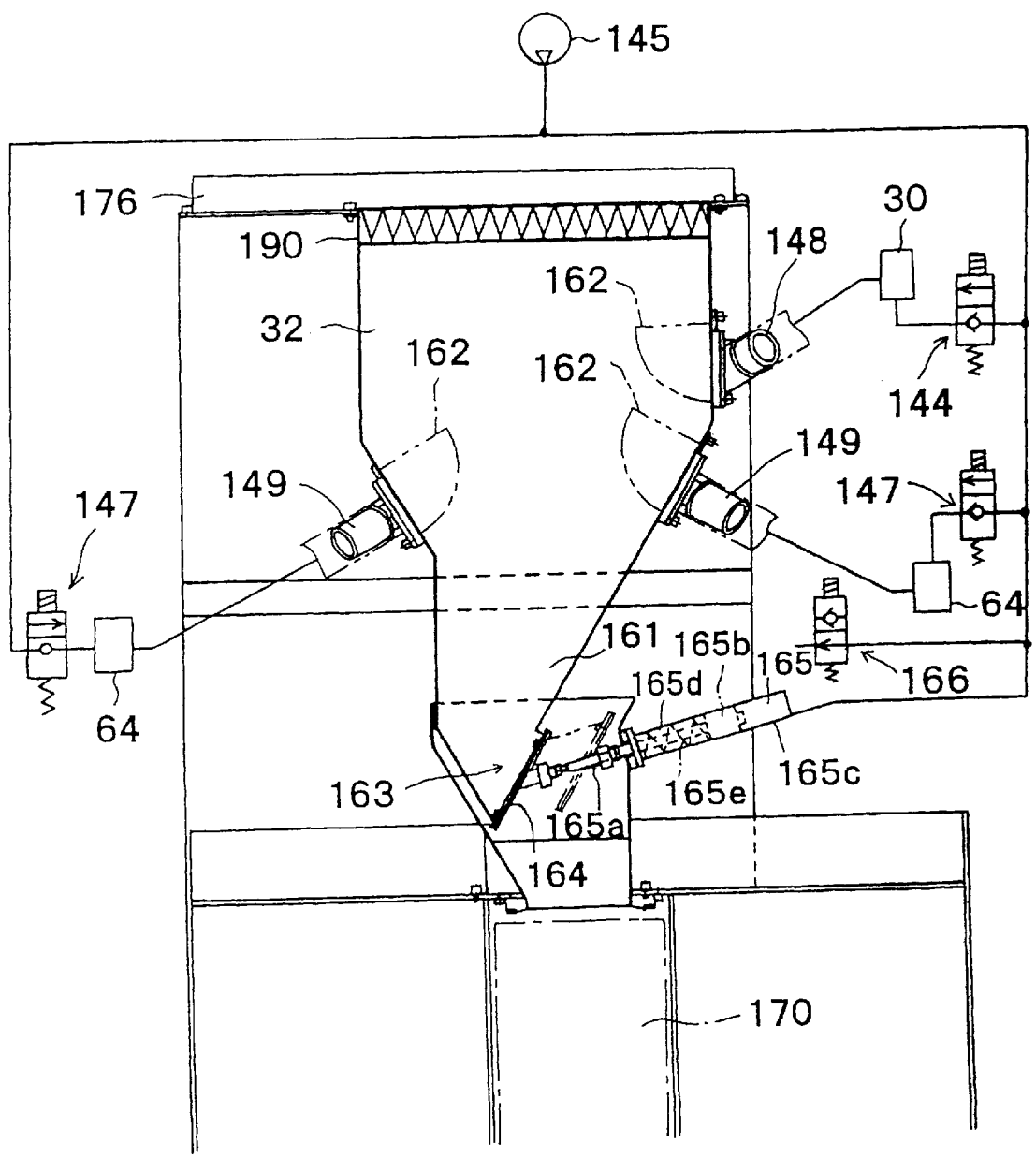
FIG. 12 is a view showing the details of the chip collecting apparatus.

The dust collector 32 is adapted to separate chips from sucked air. As shown in FIG. 12, the dust collector 32 has a filter 190 which allows only air to pass through the filter to the upper side to thereby cause chips to remain inside the dust collector 32. Introduction ports 148 and 149 are formed in the side walls of the dust collector 32, and a chip pool section 161 is formed at the bottom of the dust collector 32.

The introduction port 148 is connected to the chip suction apparatus 30, while the introduction port 149 is connected to a chip suction apparatus 64, which will be described later. A lid member 162 is provided for each of the introduction ports 148 and 149.

The lid member 162 is formed of a rectangular plate-shaped member. An upper side portion of the lid member 162 is swingably supported at both ends thereof above the introduction port 148 or 149, so that the lid member is opened by the pressure of air from the introduction port 148 or 149. Thus, when air flows into the dust collector 32 from only one or two of the introduction ports 148 and 149, any remaining introduction port is shut in order to prevent reverse low of air.

The chip pool section 161 is composed of a chip falling-down opening 163 formed at the bottom of the dust collector 32, a shutter plate 164 for shutting the chip falling-down opening 163, and an open/close cylinder 165 for opening and closing the shutter plate 164. when air flows into the dust collector 32 from the introduction ports 148 and 149, the open/close cylinder 165 closes the chip falling-down opening 163 by means of the shutter plate 164. When air does not flow into the dust collector 32 from the introduction ports 148 and 149, the open/close cylinder 165 opens the chip falling-down opening 163 through movement of the shutter plate 164.

As shown in FIG. 12, the open/close cylinder 165 has a cylinder rod 165a and a piston 165b. The cylinder rod 165a is connected to the shutter plate 164, and the piston 165b is connected to one end of the cylinder rod 165a and divides the interior of the open/close cylinder 165 into two cylinder chambers 165c and 165d.

The cylinder chamber 165c which is opposite the end surface from which the cylinder rod 165a projects is connected to an air pump 145, while the other cylinder chamber 165d accommodates a spring 165e therein.

In an air supply passage between the air pump 145 and the open/close cylinder 165 is provided a solenoid relief value 166 for relieving air. The solenoid relief value 166 is controlled by means of the sequence controller 158. When the chip falling-down opening 163 is to be closed by means of the open/close cylinder 165, the solenoid relief valve 166 is closed in order to supply air to the open/close cylinder 165. When the chip falling-down opening 163 is to be opened, the solenoid relief value 166 is opened in order to relieve air so that the piston 165b is moved by the action of the spring 165e.

Below the chip falling-down opening 163 is disposed a chip collection bin 170 having wheels 171 attached to the bottom surface thereof. The wheels 171 enables movement of the chip collection bin 170.

A control box 173 is disposed at the back of the dust collector 32. The control box 173 accommodates therein the Z-axis servo amplifier 153, the servo amplifier 155, the sequence controller 158, etc. A fan 174 is attached within the control box 173 in order to circulate air within the control box 173.

At the top of the control box 173 is formed an air duct 176. Air discharged from the filter 190 of the dust collector 32 enters the air duct 176 from one end thereof, while the other end of the air duct 176 is opened to the atmosphere.

Figure 9:
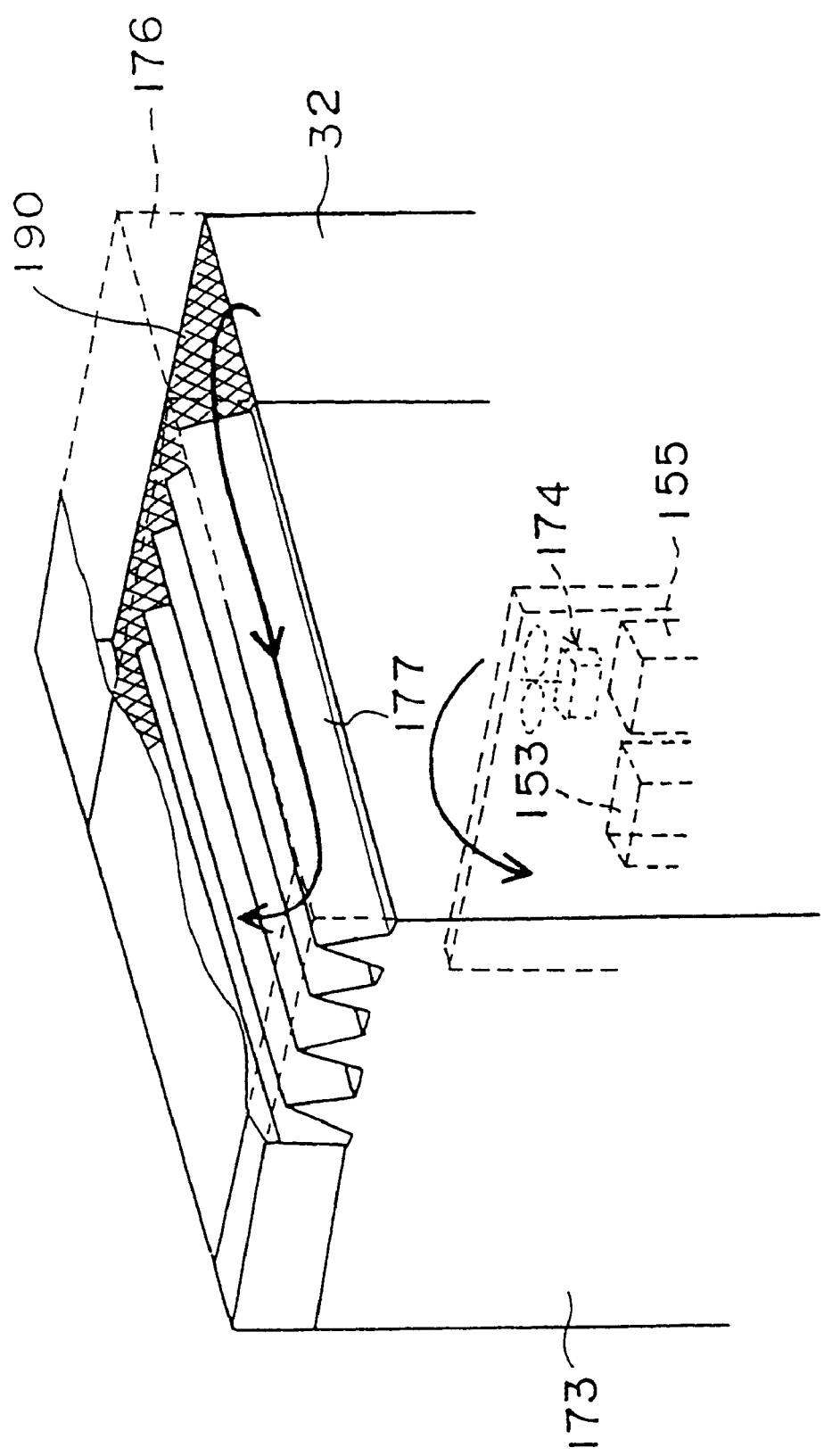
FIG. 9 is an explanatory view showing air circulation in a control box.
Figure 10:
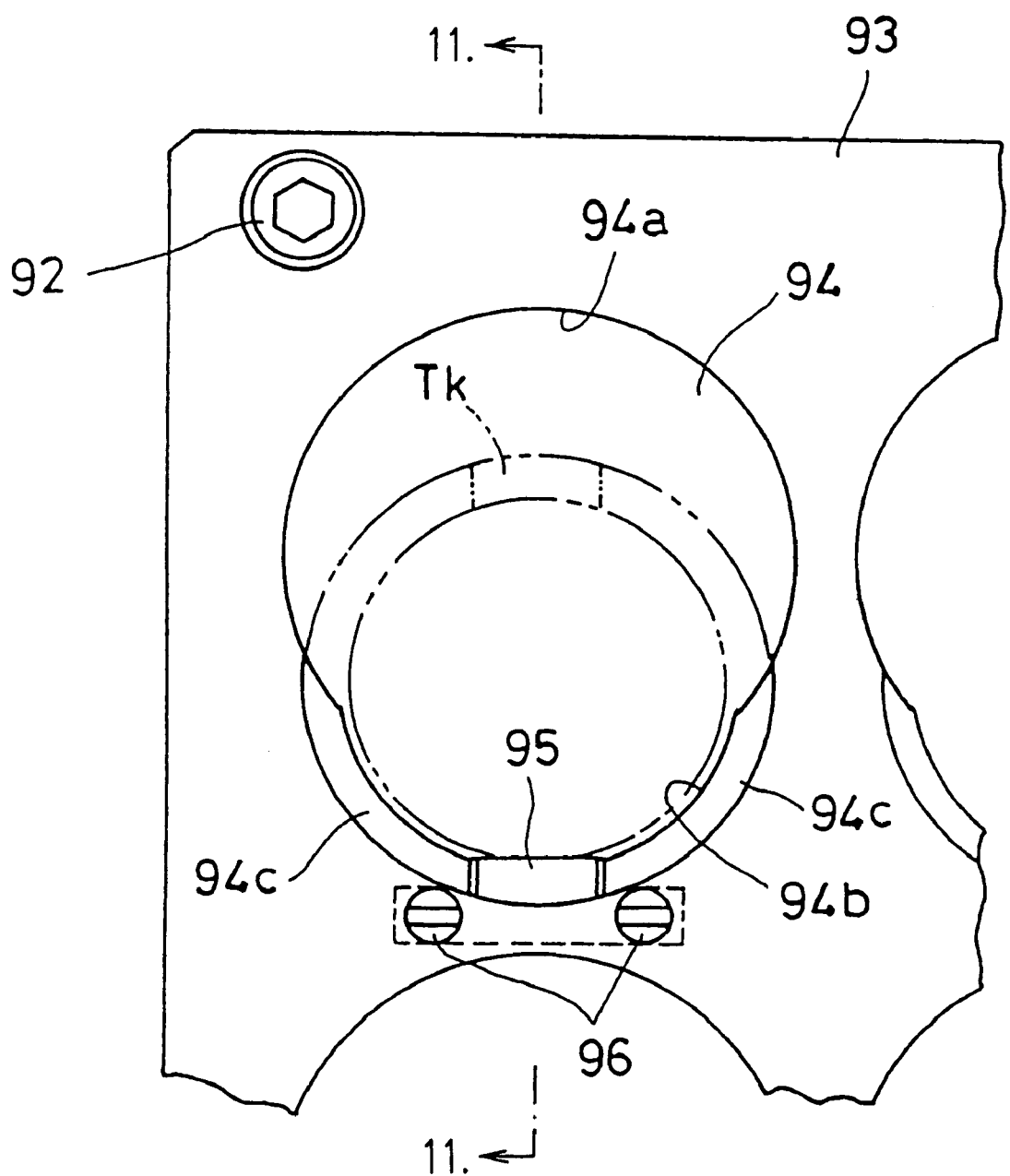
FIG. 10 is an enlarged partial front view of the tool magazine.

As shown in FIG. 9, a fin 177 is disposed between the air duct 176 and the control box 173 in order to partition them from each other.

The fin effects heat exchange between the interior of the control box 173 and the air duct 176. Air heated by the Z-axis servo amplifier 153, the servo amplifier 155, the sequence controller 158, etc. is sent to the vicinity of the fin 177 by means of the fan 174. The heat of the air is then discharged to the air duct 176 by the heat exchange action of the fin 177. In the present embodiment, the fin 177 is used as a member for heat exchange. However, a plate formed of a material having a high heat conductivity (e.g., copper, aluminum, other metals) may be used as is.

A chip suction port 62 is formed at the narrow bottom portion of each chip collecting space CP located on the side toward the base 10. The chip suction port 62 communicates with a chip transport passage 63, which extends in the front/back direction within the lower portion of the base 10. The transport passage 63 leads to the rear portion of the base 10, where it is connected to the dust collector 32 via an unillustrated pipe. In the vicinity of the suction port 62 of each transport passage 63 is disposed a chip suction apparatus 64, which jets compressed air to the rear side in order to transport chips that have fallen down to the bottom portion of the chip collecting space CP into the transport passage 63.

As in the case of the chip suction apparatus 30, each chip suction apparatus 64 is connected to the air pump 145 via a solenoid valve 147, which is electrically connected to the sequence controller 158.

In the present embodiment, the chip suction apparatuses 30 and 64 share the air pump 145. However, a separate air pump may be provided for each of the chip suction apparatuses 30 and 64. The air pump 145 may be disposed at any location in the machine tool. Since the chip suction apparatuses 30 and 64 are separated from the air pump 145, only spaces for installing the chip suction apparatuses 30 and 64 are required to be formed within the bed 10.

As shown in FIG. 6, the central bridge portion 10j of the base 10 and the central bridge portion 60j of the front member 60 corresponding thereto surround the outer circumference of the cup portion 37a of the workpiece support body 37 with a small clearance formed therebetween. At the upper-end circumferential portions of the central bridge portions 10j and 60j is fixed an annular-shaped seal holding ring 67, and a seal member (reference numeral omitted) formed of an elastic material such as rubber is held at the upperend inner circumferential portion of the holding ring 67 in such a manner that the lip portion of the seal member comes into sliding contact with the outer circumference of the cup portion 37a. Since the seal portion is formed in a circular shape, there can be reliably prevented invasion of chips into the guide mechanism portion and the feed mechanism portion of the workpiece support body 37.

Next, a description will be given of an automatic tool change apparatus with reference to FIGS. 4, 8, 10, and 11. The tool change apparatus ATC is mainly composed of a tool change arm unit 80, a tool magazine 90, and an intermediate transport unit 100, which are mounted on a unit substrate 71 provided separately from the machine body MTB in order to constitute the tool change apparatus ATC as a single unit. Through use of a plurality of bolts 72, the unit substrate 71 is fixed to the right-side surfaces of the base 10 and the front member 60 in order to join the tool change apparatus ATC with the machine body MTB. The attached drawings show a state in which the tool change apparatus ATC has been assembled to the machine body MTB. Hereinafter, a detailed description will be given of operation of the tool change apparatus ATC in the assembled state.

The unit substrate 71 also serves as a member for defining the right-end surface of the V-shaped space CP for chip collection formed on the right side of the central bridge portions 10j and 60j.

Figure 8:
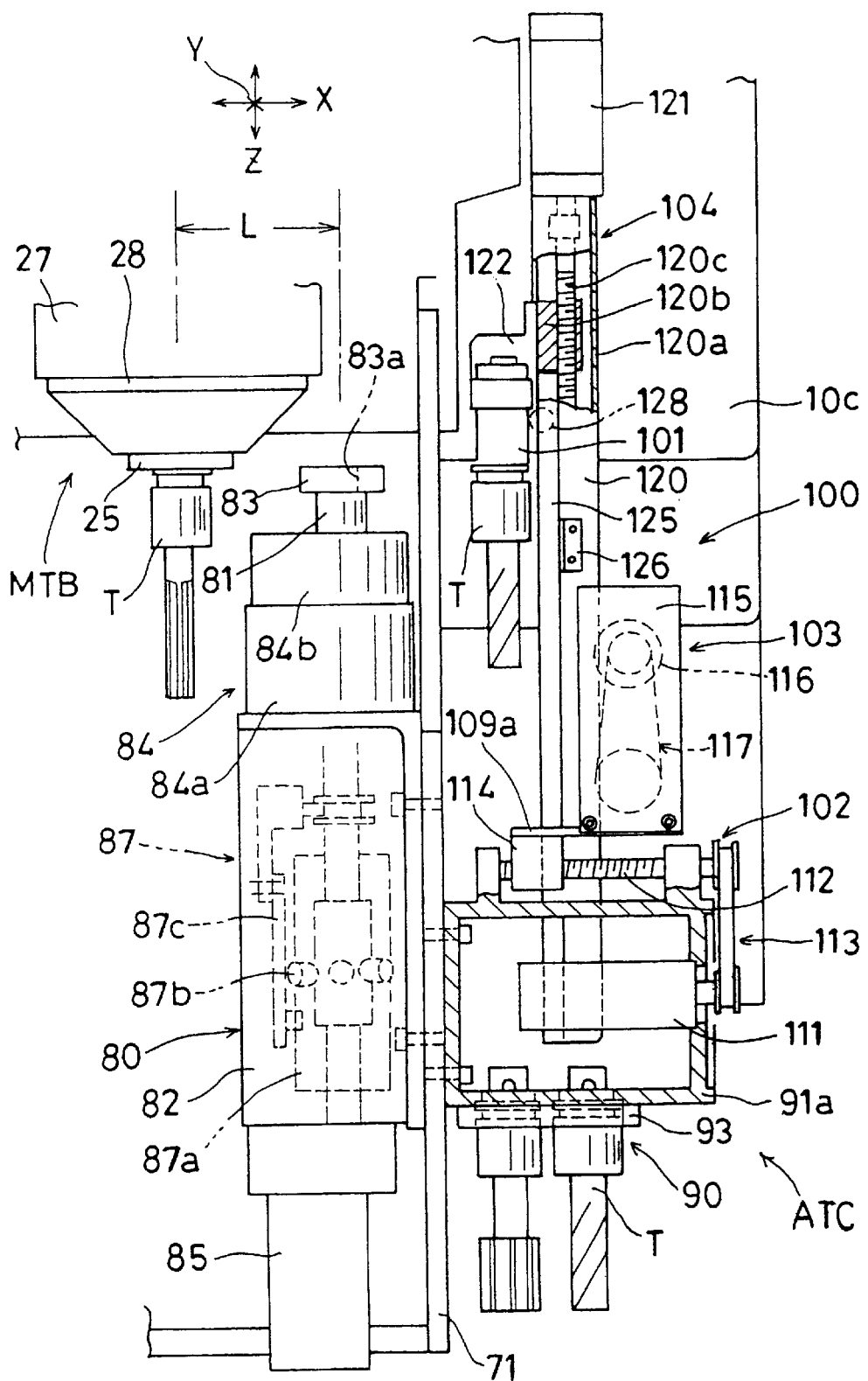
FIG. 8 is an enlarged plan view of the tool change unit shown in FIG. 1 in which the tool change unit is partially cut away.

As shown in FIG. 8, the tool change arm unit 80 is fixed to the left-side surface of the unit substrate 71 such that an arm shaft 81 is parallel to the tool spindle 25. The arm shaft 81 is supported to be rotatable and axially movable within a housing 82 of the tool change arm unit 80. The arm shaft 81 is rotated and axially moved by means of a cam-type drive mechanism 87 which is accommodated within the housing 82 and is driven by means of a servomotor 85 fixed to the front end of the housing 82. The rear end of the arm shaft 81 penetrates the rear end surface of the housing 82, and the central portion of a tool change arm 83 is fixed to the rear end of the arm shaft 81. The tool change arm 83 has a pair of tool grip portions 83a (see FIG. 3) formed at opposite ends thereof.

The cam-type drive mechanism 87 is of a well-known type such as the type disclosed in Japanese Patent Application Laid-Open (kokal) No. 5-104377. The drive mechanism 87 includes a globoidal cam 87a, a spider member 87b, and a pair of link elements 87c. The globoidal cam is rotated by means of the motor 85. The spider member 87b is in engagement with a peripheral cam groove of the cam 87a to be rotated thereby and is in spline-engagement with the arm shaft 81 in order to directly rotate the arm shaft 81. The pair of link elements 87c are in engagement with a cam-way formed on a side surface of the globoidal cam 87a to be swung thereby and are in engagement with the arm shaft 81 in order to axially move the arm shaft 81 synchronously with the rotation thereof.

The tool change arm 83 driven by the cam mechanism operates as follows. When a tool change command is issued from the numerical controller NC (see FIG. 4) in a state shown in FIG. 8 in which the tool change arm 83 is oriented vertically, i.e., positioned at its origin, the arm 83 rotates counterclockwise (as viewed in FIG. 3) by about 60 degrees in order to simultaneously grip the tool T on the tool spindle 25 to be exchanged and a tool T that is held in an intermediate transport socket 101 positioned at the tool change position shown in FIG. 8 and that is to be used next. Subsequently, the arm shaft 81 advances in order to pull the tools out of the tool spindle 25 and the socket 101, respectively, and further rotates counterclockwise by 180 degrees in order to exchange the positions of the tools T. Subsequently, the arm shaft 81 retracts in order to insert the tools T into the tool spindle 25 and the socket 101, respectively, and rotates clockwise (as viewed in FIG. 3) about 60 degrees in order to return to the illustrated original position.

The above-described tool change operation of the arm 83 is well known. However, in the tool exchange apparatus 80 of the present embodiment, the arm shaft 81 projects from the housing 82 toward the back side of the machine tool when the arm shaft 81 is located at the original position. A telescopic cover apparatus 84 includes a stationary cover 84a fixed to the housing 82 and a movable cover 84b that advances and retracts together with the arm shaft 81. Thus, the cover apparatus 84 surrounds a portion of the arm shaft 81 projecting from the rear end of the housing 82 in order to prevent contamination of the arm shaft 81 by chips.

Since the housing 82 accommodating the cam mechanism 87 for driving the arm shaft 81 is fixedly disposed in front of the spindle head 20, the spindle head 20 can be moved closer to the tool change arm unit 80 in the right/left direction (X-axis direction). That is, there can be decreased the distance L between the tool spindle 25 and the arm shaft 81 in the state in which the spindle head 20 is positioned at the tool change position shown in the drawings, and therefore, the length of the tool change arm 83 can be shortened compared to the case where the tool change arm unit 80 is disposed at the side of the spindle head 20. This increases the rotational speed of the tool change arm 83, thereby decreasing tool change time.

The tool magazine 90 and the intermediate transport unit 100 share frames 91a and 91b which are fixed to the right-side surface of the unit substrate 71 at upper and lower positions and which serve as mount bases. A tool-holding plate 91 is provided between the frames 91a and 91b (see FIG. 3). Since the tool magazine 90 and the intermediate transport unit 100 are attached to the surface of the unit substrate 71 opposite the surface to which the tool change arm unit 80 is attached, the tool change arm 80 can be disposed closer to the spindle head 20, and the tool magazine 90 and the intermediate transport unit 100 can be isolated from chips. The tool magazine 90 includes a plate member 93 whose upper and lower end portions are fixed to the frames 91a and 91b through use of bolts 92 such that the plate member 93 becomes perpendicular to the unit substrate 71.

As shown in FIG. 31 the plate member 93 has a plurality of tool-holding holes 94 arranged in a left row and a right row in order to store a plurality of tools in parallel to the above-described arm shaft 81. As is shown in the enlarged drawings of FIGS. 10 and 11, each of the tool-holding holes 94 is formed by an upper large hole portion 94a and a lower small hole portion 94b. The upper large hole portion 94a has a diameter slightly larger than the maximum diameter of the largest tool used in the machine tool, while the lower small hole portion 94b has a diameter corresponding to the diameter of a tool-holding groove Tm of the holding portion of each tool T.

At the lowest position of the small hole portion 94b, a slot is formed from the rear surface of the plate member 93 of the magazine 90, and a key 95 is fitted into the slot. The key 95 is fixed through use of bolts 96 inserted from the front surface of the plate member 93. The key 95 comes into engagement with one of keyways Tk that are formed in the holding portion of each tool T such that they are radially symmetrical with one another. Thus, each tool T is stored in the magazine 90 at a predetermined angular phase.

The large hole portion 94a of each tool-holding hole 94 allows a tool to pass therethrough in the axial direction. This structure enables each tool T to be inserted into the tool-holding hole 94 from the front side of the machine tool (from the left side in FIG. 4) and to thereby be held in the tool-holding hole 94, to be removed to the rear side of the magazine 90 while being held by the intermediate transport unit 100, and to be removed from the front side of the magazine 90 after being returned to the tool-holding hole 94 from the rear side of the magazine 90 by the intermediate transport unit 100.

The advantage of the tools T being able to be stored into and removed from the magazine 90 from the front side of the machine tool becomes remarkable in the case where a plurality of machine tools having the above-described structure are disposed side by side in the right/left direction in FIG. 1 so that a worker's accessibility to right and left sides of each machine tool is limited, or in the case where there is employed an automatic tool supply system in which a self-propelled vehicle for tool supply travels along a path on the front side of the plurality of machine tools.

The intermediate transport unit 100 is mainly composed of a transverse positioning mechanism 102, a vertical positioning mechanism 103, and a front/back positioning mechanism 104, which position the intermediate socket 101 in the X-axis, Y-axis, and Z-axis directions, respectively. The transverse positioning mechanism 102 includes upper and lower guide rails 106a and 106b disposed horizontally at the back of the upper and lower frames 91a and 91b to be parallel to the magazine 90. Upper and lower brackets 109a and 109b for fixing and supporting the upper and lower ends of a vertically-extending vertical guide post 108 are integrally fixed to guide blocks 107a and 107b, which travel on the rails 106a and 106b.

As shown in FIG. 8, the upper frame 91a supports a servomotor 111 disposed in parallel to the guide rail 106a, and rotatably supports opposite ends of a feed screw 112. The servomotor 111 and the feed screw 112 are connected with each other via a rotation transmission mechanism 113 including pulleys and a timing belt wound therearound. The feed screw 112 is in screw-engagement with a nut 114 fixed to the upper bracket 109a. Accordingly, through control of the servomotor 111, the vertical guide post 108 can be moved in the right/left direction in order to align the intermediate transport socket 101 which moves together with the guide post 108 in the right/left direction with a right or left row of the tool-holding holes 94 of the magazine 90.

The vertical guide post 108 serving as the vertical positioning mechanism 103 includes a frame member whose opposite ends are fixed to the brackets 109a and 109b and which has a C-shaped cross section, a sliding piece that is slidable within the frame member, and a feed screw which is rotatably supported by the upper end of the frame member and is in screw-engagement with the center portion of the sliding piece. One end of a housing 115 is fixed to the upper end of the frame member, and a servomotor 116 is attached to the lower surface of an overhang at other end of the housing 115. The housing 115 accommodates a rotation transmission mechanism 117 including a timing belt and a pair of pulleys. Since the distance between the arm shaft 81 and the intermediate tool socket 101, i.e., the length of the tool change arm 83, can be shortened, tool change time can be shortened through an increase in rotational speed of the arm shaft 81.

The sliding piece fixedly supports in a horizontal state a front/back guide post 120 constituting the front/back positioning mechanism 104 disposed in parallel to the arm shaft 81. As shown by partial cutaway view, similar to the vertical guide post 108, the front/back guide post 120 includes a frame member 120a having a C-shaped cross section, a sliding piece 120b, and a feed screw 120c. A servomotor 121 for rotating the feed screw 120c is attached to the rear end of the frame member 120a.

A socket holder 122 is fixed to the sliding piece 120b and supports the intermediate transport socket 101 in such a manner that the intermediate transport socket 101 is rotatable about an axis parallel to the arm shaft 81. The intermediate transport socket 101 has an unillustrated tapered hole for receiving a tapered portion Ts of a tool T (see FIG. 11) and includes therein an unillustrated ball-detent mechanism. When the tool T is inserted into the intermediate transport socket 101, the detent mechanism comes into engagement with an elongated window that is formed at the tapered portion Ts and penetrates from the outer surface to the inner surface of the tapered portion Ts. Thus, the tool T is reliably held.

The front/back guide post 120 is moved vertically through operation of the servomotor 116, so that the intermediate transport socket 101 is positioned at a vertical position corresponding to the height of the small hole portion 94b or the large hole portion 94a of a desired one of the tool-holding holes 94 of the tool magazine 90. Further, through operation of the servomotor 121, the front/back guide post 120 can position the intermediate transport socket 101 at any of three positions, i.e., a tool change position shown in FIG. 8, a tool takeout position where the intermediate transport socket 101 comes into engagement with the tapered portion Ts of one of the tools T held in the tool magazine 90, and an index position which is offset rearward from the tool takeout position by an amount slightly greater than the length of the tapered portion Ts.

Further, through use of a fastening plate 126, an elongated cam plate 125 is attached to the top surface of the frame member 120c of the front/back guide post 120 in parallel to the top surface. As shown in FIG. 4, a cam groove 125a is formed in the cam plate 125 such that the cam groove 125a changes in vertical position as it changes in longitudinal position. The cam groove 125a guides a spherical boss of a lever 128 that projects from the intermediate transport socket 101 in the radially outward direction. While the intermediate transport socket 101 is moved between the above-described tool takeout and tool change positions, the lever 128 of the intermediate transport socket 101 is turned along the cam groove 125a, so that the rotational angle phase of the keyway Tk of the tool T held in the intermediate transport socket 101 is changed.

Next, a description will be given of the operation of the present embodiment having the above-described structure.

At the original position shown in the drawings, the spindle head 20 is located at the tool change position defined at the right end in the X-axis direction, and a new tool T that has been attached to the tool spindle 25 by means of the tool change arm unit 80 is fixedly held at the tip end of the tool spindle 25. The workpiece support body 37 is located at the most elevated position. The first index member 45 is in a position where the clamp 55 is directed toward the tool spindle 25. Moreover, the second index member 53 is in a position where the longitudinal direction of the clamp 55 in an unclamped state coincides with the X-axis direction.

When a pallet P supporting a workpiece to be machined is engaged with the clamp 55 by means of an unillustrated loader unit which moves in the X-axis direction, a machining operation is performed as follows under control of the numerical controller NC.

First, through operation of the clamp cylinder 56, the pallet P is caused to seat on the second index member 53 and is then clamped. Subsequently, the tool spindle 25 is rotated by means of the unillustrated built-in motor, and simultaneously the spindle head 20 is moved leftward in FIG. 1 by means of the servomotor 14 in order to face the workpiece W. Subsequently, through operation of the servomotor 21, the spindle head 20 is advanced toward the workpiece W.

Meanwhile, the workpiece support body 37 is lowered through operation of the servomotor 40, and the first and second index members 45 and 53 are indexed by means of the first and second index mechanisms 44 and 54 in order to direct a portion to be machined of the workpiece W to the tool T. Through proper operation of the first and second index mechanisms 44 and 54, all surfaces of the workpiece W excepting the surface for attachment to the pallet P (five surfaces in the case where the workpiece W is a rectangular hexahedron) can be selectively directed to the tool T at a desired angle. Further, through combination of positioning of the spindle head 20 to an arbitrary position in a horizontal X-Z plane and positioning of the workpiece support body 37 to an arbitrary vertical position, desired machining is effected on a desired portion of the workpiece W.

Since the workpiece support body 37 is provided at substantially the center in the right/left direction of the base 10 having a substantially rectangular parallelepiped shape, during the machining operation the X-axis slide 12 and the spindle head 20 are positioned near the center of the base 10 in the right/left direction (X-axis direction). Further, since the pair of guide rails 36 of the workpiece support body 37 are disposed symmetrically with respect to the vertical plane including the axis of the tool spindle 25 positioned at the center in the X-axis direction, the guide portions of each of the X-axis slide 12, the spindle head 20, and the workpiece support body 37 assume symmetrical positions with respect to the tool spindle 25 in the right/left direction (X-axis direction) during the operation of machining the workpiece W, thereby strongly withstanding machining resistance. That is, since the workpiece W and the tool spindle 25 are disposed substantially symmetrically in the X-axis direction, thermal deformation of the base 10 has an effect only in the Z-axis direction, and adversary effect of the thermal deformation onto machining accuracy in the X-axis and Y-axis directions can be minimized.

Chips produced during the above-described machining operation naturally fall down to the bottom portion 10u of the V-shaped chip collecting space CP disposed on either side of the first index member 45. The chips are then sucked to the transport passage 63 from the suction port 62 opened to the bottom portion 10u and are then air-transported to the rear side of the base 10. The chips are further transported to the dust collector 32 via an unillustrated pipe.

Figure 5:
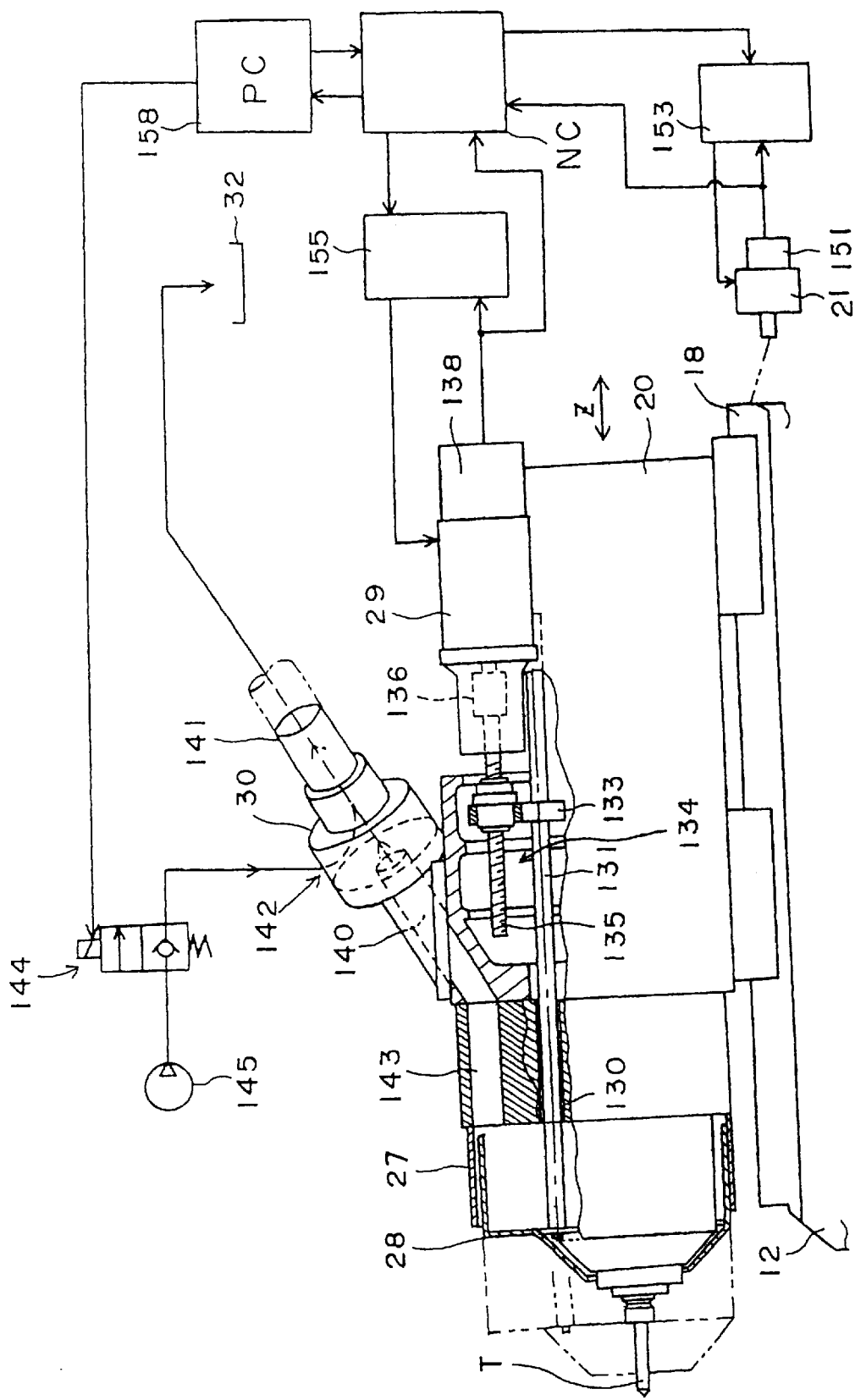
FIG. 5 is an enlarged view of a main portion of the spindle head combined with a block diagram of a numerical controller.

Upon completion of the machining by use of the tool T on the tool spindle 25, the spindle head 20 is returned to the tool change position shown in FIG. 1. At this time, the intermediate transport socket 101 holds a tool T to be used next, while being positioned at a farthest retracted tool change position as shown in FIG. 5, at which point the intermediate transport socket 101 is symmetrical to the axis of the tool spindle 25 with respect to the arm shaft 81. Upon completion of retraction of the spindle head 20 to the tool change position, the servomotor 85 of the tool change arm unit 80 is operated in order to drive the cam-type drive mechanism 87 accommodated within the housing 82 of the tool change arm unit 80.

The arm shaft 81 rotates counterclockwise in FIG. 3 by about 60 degrees in order to cause the tool change arm 83 to simultaneously grip the tool held in the tool spindle 25 and the tool held in the intermediate transport socket 101, by use of the gripping portions 83a provided at opposite ends of the tool change arm 83. Subsequently, the arm shaft 81 advances toward the housing 82 by a predetermined amount in order to pull out the tools, and further rotates in the same direction by 180 degrees. Subsequently, the arm shaft 81 retracts by a predetermined amount in order to insert the tools T, which have exchanged positions, into the tool spindle 25 and the intermediate transport socket 101. An unillustrated tool clamp mechanism built into the tool spindle 25 releases the tool T simultaneously with the completion of the 60-degree counterclockwise rotation of the arm shaft 81 and clamps the tool T against the tool spindle 25 simultaneously with the completion of the retraction movement of the arm shaft 81.

The arm shaft 81 then rotates clockwise by about 60 degrees, so that the tool change arm 83 is returned to the vertical position. Subsequently, as described above, the spindle head 20 is fed leftward to a machining position facing the workpiece W in order to perform machining operation through use of the new tool T.

Concurrently, the intermediate transport unit 100 is operated. First, the servomotors 111 and 116 of the transverse positioning mechanism 102 and the vertical positioning mechanism 103 are started simultaneously in order to move the intermediate transport socket 101 such that the old tool T held in the intermediate transport socket 101 is aligned with the center of the large hole portion 94a of an empty tool-holding hole 94 to which the old tool T is to be returned. Subsequently, the servomotor 121 of the front/back positioning mechanism 104 is started so as to advance the intermediate transport socket 101 to the forwardmost takeout position. During this advance movement, the lever 128 is guided along the cam groove 125a of the cam plate 125, so that the intermediate transport socket 101 is rotated by a predetermined angle on the socket holder 122. As a result, the keyway Tk of the tool T is directed in a downward direction when the tool T arrives at the tool takeout position.

In this state, the servomotor 116 of the vertical positioning mechanism 103 moves the front/back guide post 120 downward such that the holding groove Tm of the tool T on the intermediate transport socket 101 comes into engagement with arcuate brim portions 94c of the small hole portion 94b of the tool-holing hole 94, with the result that the tool T is seated on the tool magazine 90. The distance of the downward movement is equal to the distance between the center of the large hole portion 94a and the center of the small hole portion 94b.

Subsequently, the servomotor 121 of the front/back positioning mechanism 104 retracts the intermediate transport socket 101 from the takeout position by a predetermined distance in order to return the intermediate transport socket 101 to the index position where the socket 101 is separated from the tool T. After this return motion, at least one of the transverse positioning mechanism 102 and the vertical positioning mechanism 103 is operated in order to align the empty intermediate transport socket 101 with a tool T on the tool magazine 90 to be used next. Subsequently, the front/back positioning mechanism 104 is operated to advance the intermediate transport socket 101 from the index position to the tool takeout position in order to receive and hold the tool T to be used next.

The vertical positioning mechanism 103 is then operated to move upward the tool T to be used next that has been received and held by the intermediate transport socket 101, by a distance corresponding to the distance between the center of the large hole and the center of the small hole of the tool holing hole 94, so that the tool T is moved from the tool magazine 90 to the intermediate transport socket 101. Further, the intermediate transport socket 101 is retracted to the rearmost position by means of the front/back positioning mechanism 104, and is then returned to the tool change position shown in FIG. 8 through operation of at least one of the vertical positioning mechanism 103 and the transverse positioning mechanism 102. In this state, a next operation of the tool change arm unit 80 is awaited. Thus, a single cycle of tool change operation is completed.

Figure 13:
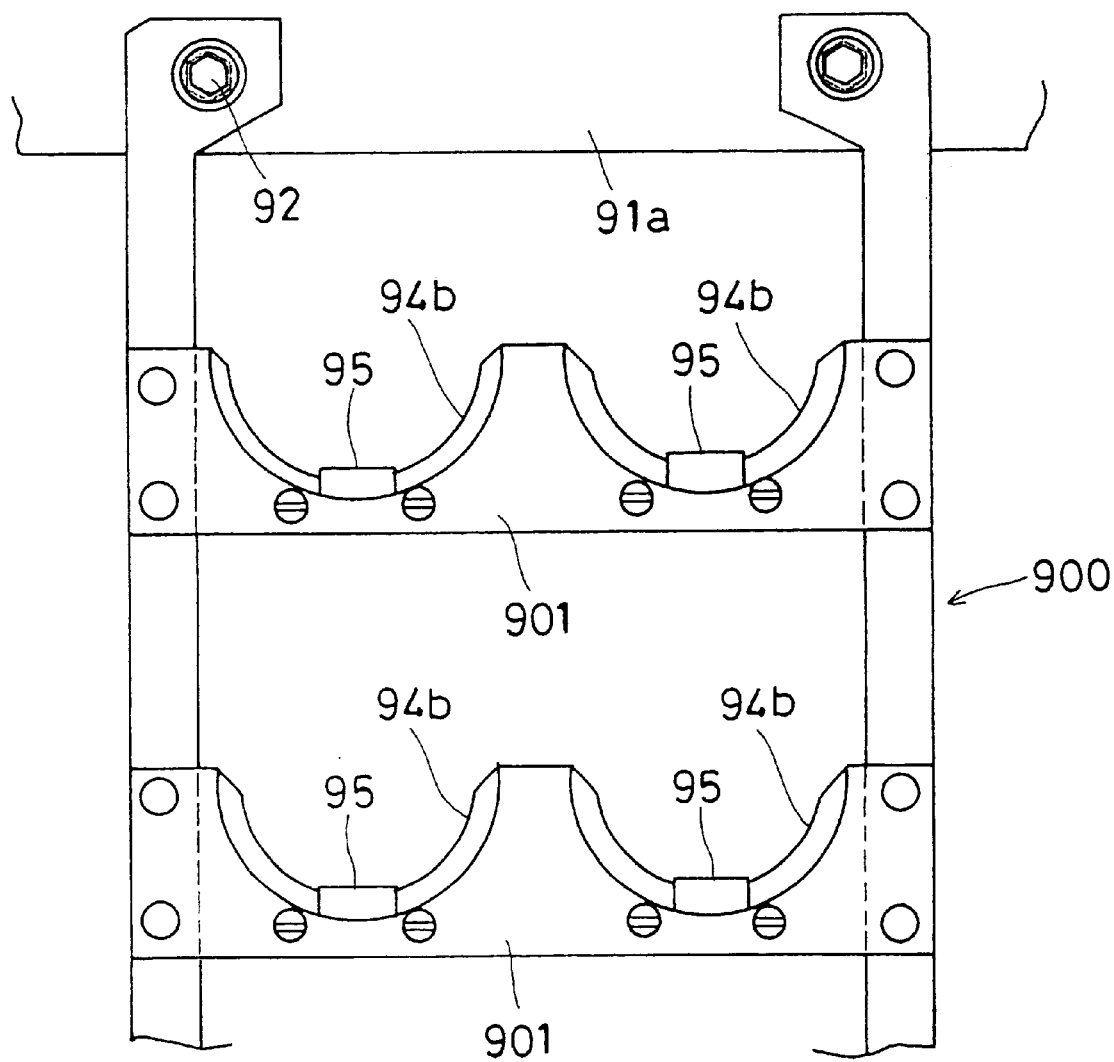
FIG. 13 is an enlarged partial front view of a tool magazine according to another embodiment of the present invention.

FIG. 13 shows another embodiment of the tool magazine 90. The tool magazine 900 of the present embodiment has a ladder shape. A tool-holding portion 94b corresponding to the small hole portion in the above-described embodiment is formed in the upper portion of each of a plurality of cross beams 901. A space between cross beams 901 adjacent in the vertical direction is used as a space for taking out a tool T.

In the above-described embodiment, the tool change apparatus ATC is directly attached to a side surface of the front portion of the machine body MTB. However, the tool change apparatus ATC may be of a separated type in which the tool change apparatus ATC is disposed separately from the base 10 of the machine body MTB. In this case, the front member 60 is formed symmetrically in the right/left direction such that the front member 60 has a side wall that covers the right end surface of the right-side chip collecting space CP.

In the tool change apparatus ATC of the above-described embodiment, the tool change arm unit 80 is designed such that the tool change arm 83 is aligned, in the radial direction of the spindle, with the tip end of the tool spindle 25 at the tool change position, and the housing 80 including the drive section for the tool change arm 83 is disposed in a non-overlapped manner. Therefore, there can be decreased the distance between the axis of the tool spindle 25 at the tool change position and the arm shaft 81; i.e., the length of the tool change arm 83. As a result, tool change time-can be shortened through an increase in rotational speed of the arm shaft 81.

In the tool change apparatus ATC of the above-described embodiment, the tool magazine 90 is provided at the front of the machine tool body, and tools T can be stored into and removed from the magazine 90 from the front side of the machine tool through movement parallel to a tool T attached to the tool spindle 25 with the same posture as that of the tool T attached to the tool spindle 25. Further, the intermediate transfer unit 100 can take out and return tools T from and to the magazine 90 from the rear side of the magazine 90. Therefore, setting of tools T onto the tool magazine 90 is facilitated, and the structure of the intermediate transfer unit 100 can be simplified.

Further, the tool change arm unit 80, the tool magazine 90, and the intermediate transport unit 100 are attached to a single base 71 so as to form an integrated unit, and the attachment of the integrated unit to the machine body MTB is performed through only attachment of the base 71 to the machine body MTB. Therefore, the assembly work as well as subsequent maintenance and inspection work for the machine body MTB and the automatic tool change apparatus ATC become easier.

The automatic tool change apparatus ATC of the above-described embodiment is preferably applied to a horizontal machine tool having a horizontal spindle. However, the automatic tool change apparatus of the present invention can be applied to a vertical machine tool having a vertical tool spindle. In this case, in order to reliably hold a tool T in the tool magazine 90 parallel to the vertical tool spindle, holding means is advantageously provided for each tool-holding section 94b of the tool magazine 90 such that the holding means advances and retracts at a location that is radially opposite the tool-holding section 94b.

Next, the operation of the machine tool having the above-described structure will be described along with the processing that is actually performed by the numerical controller NC in accordance with an NC program stored in the numerical controller NC.

Figure 14:
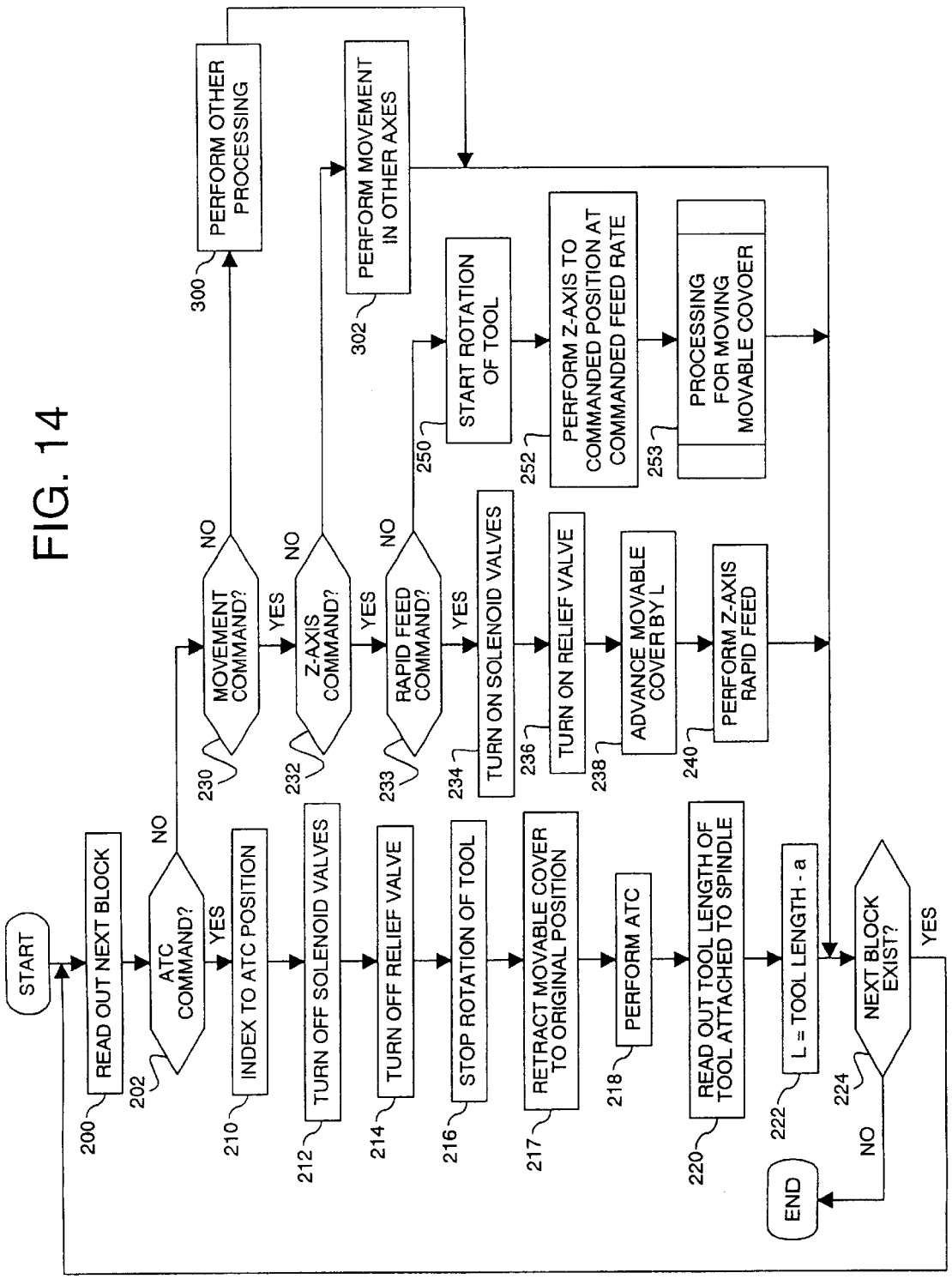
FIGS. 14 and 15 are flowcharts showing processing performed by the numerical controller.
Figure 15:
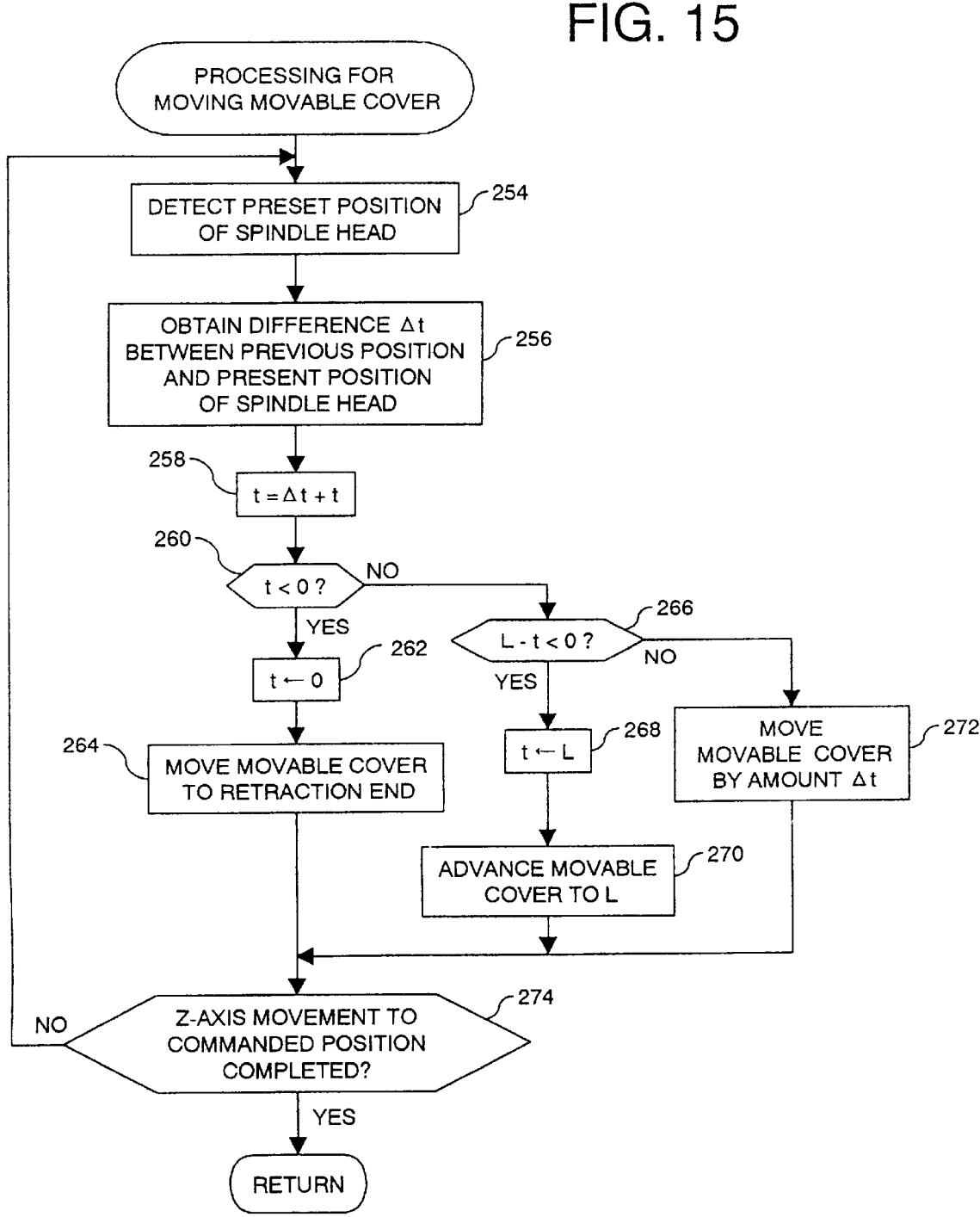

FIGS. 14 and 15 show flowcharts showing the processing that is performed by the numerical controller NC in accordance with an NC program stored in the numerical controller NC.

In step 200, one block of the NC program is read out. The processing then proceeds to step 202 in order to make a judgment as to whether a command contained in the read-out block of NC program is an ATC command (tool change command).

When the command contained in the read-out block is an ATC command, the processing proceeds to step 210, and when the command contained in the read-out block is not an ATC command, the processing proceeds to step 230.

In step 210, the spindle head 20 is moved to the tool change position (the position of the spindle head 20 shown in FIG. 3).

Subsequently, in step 212, a command for turning off the solenoid valves 144 and 147 is output to the sequence controller 158. As a result, the solenoid valves 144 and 147 are closed in order to stop supply of air to the chip suction apparatuses 30 and 64.

In step 214, the solenoid relief valve 166 is opened in order to relieve to the atmosphere air supplied from the air pump 145, and the open/close cylinder 165 is operated to open the chip falling-down opening in order to discharge into the chip collecting bin 170 chips accumulated in the chip pool section.

In step 216, rotation of the tool spindle 15 is stopped, and in step 217, the servomotor 29 is driven to move the movable cover 28 to the retraction end in order to prevent interference between a tool T and the movable cover 28, which would otherwise occur when the tool T is attached to or removed from the tool spindle 15.

In step 218, the tool change apparatus ATC is operated in order to exchange the tool T held in the tool spindle 15 with a tool that is stored in the tool magazine 90 and is designated by the NC program.

As described above, when an ATC command is detected, steps 210–218 are performed, so that the spindle head 20 is moved to the tool change position; suction of chips by means of the chip suction apparatuses 30 and 64 is stopped; chips accumulated in the chip pool section are discharged into the chip collecting bin 170; rotation of the tool spindle 15 is stopped; the movable cover 28 is returned to the retraction end; and the tool change operation is then performed.

When the tool change operation in step 218 is completed, the processing proceeds to step 220 in order to read out the tool length of the tool T attached to the tool spindle 15, and then proceeds to step 222 in order to obtain a length L by subtracting a predetermined length a from the tool length of the tool T attached to the tool spindle 15.

The length L is a value indicating an advancement end of the movable cover 28, which value changes in accordance with the type of tool T attached to the tool spindle 15. The length L is stored unchanged in the numerical controller NC until the tool T attached to the tool spindle 15 is replaced with a different tool T at step 218.

After the processing proceeds to step 224, a judgment is made as to whether a next block of the NC program exists. When the next block exists, the processing returns to step 200. When the next block does not exist, the processing is ended.

When it is judged in step 202 that the command contained in the read-out block is not an ATC command, the processing proceeds to step 230 in order to make a judgment as to whether the command contained in the read-out block is a movement command.

The movement command detected in step 230 means a command for moving the X-axis moving table 12, the spindle head 20, the movable cover 28, the workpiece support body 37, the first index member 45, or the second index member 53. When the command contained in the read-out block is a movement command, the processing proceeds to step 232. When the command contained in the read-out block is not a movement command, the processing proceeds to step 200 in order to execute a command other than the movement command and ATC command, such as a command for clamping the pallet P onto the second index member 53 or for unclamping the pallet P. Subsequently, the processing proceeds to step 224.

In step 232, a judgment is made as to whether the command contained in the read-out block is a Z-axis command; i.e., a command for moving the spindle head 20. When the command contained in the read-out block is a Z-axis command, the processing proceeds to step 233. When the command contained in the read-out block is not a Z-axis command, the processing proceeds to step 302 in order to move the X-axis moving table 12, the movable cover 28, the workpiece support body 37, the first index member 45, or the second index member 53.

In step 233, a judgment is made as to whether the detected command for Z-axis movement is a rapid feed command. When the detected command is a rapid feed command, the processing proceeds to step 234. When the detected command is not a rapid feed command, the processing proceeds to step 250.

In step 234, a command for turning on the solenoid valves 144 and 147 is output to the sequence controller 158. As a result, the solenoid valves 144 and 147 are opened in order to start supply of air to the chip suction apparatuses 30 and 64.

In step 236, the solenoid relief valve 166 is closed in order to supply the air from the air pump 145 to the cylinder chamber 165a of the open/close cylinder 165, so that the chip falling-down opening is closed through operation of the open/close cylinder 165.

With this operation, the chip suction apparatus 30 sucks air within the movable cover 28 together with chips, while the chip suction apparatus 64 sucks air within the chip collection cover 60 together with chips.

After the processing proceeds to step 238, the movable cover 28 is advanced from its retraction end to an advancement end that is forwardly offset from the retraction end by a distance corresponding to the length L.

In step 240, a movement command is output to the Z-axis servo amplifier 153 in order to drive the Z-axis servomotor 21 such that the spindle head 20 is moved at a rapid feed rate to a position designated by the Z-axis command.

When the rapid feed in step 240 is completed, the processing proceeds to step 224.

When it is judged in step 233 that the detected command is not a rapid feed command, rotation of the tool spindle 15 is started in step 250, because the detected command is a cutting feed command.

After the start of rotation of the tool spindle 15 in step 250, the processing proceeds to step 252 in order to output a move command to the Z-axis servomotor 153 so as to move the spindle head 20 to a designated position at a designated feed rate.

In step 253, processing for moving the movable cover 28 is performed. FIG. 15 shows the details of the processing for moving the movable cover 28.

As shown in FIG. 15, in step 254, a signal output from the encoder 254 is detected to obtain the present position of the spindle head 20.

In step 256, there is determined a difference between the thus-detected present position of the spindle head 20 and the previous position of the spindle head 20; i.e., an amount Δt of movement of the spindle head 20. In step 258, the movement amount ΔA is added to the total move amount t of the movable cover 28 during the cutting feed.

In step 260, a judgment is made as to whether the total movement amount t is smaller than zero. When the total movement amount t is smaller than zero, the movable cover 28 has reached its retraction end. In this case, in step 262, the total movement amount t is replaced with zero, and in step 264, the movable cover 28 is moved to the retraction end. Subsequently, the processing moves to step 274.

When the total movement amount t is not smaller than zero, the processing proceeds to step 266 in order to make a judgment as to whether the value obtained through subtraction of the total movement amount t from the value L indicating the advancement end position of the movable cover 28 is smaller than zero. When the thus-obtained value is smaller than zero, the movable cover 28 has reached its advancement end. In this case, in step 268, the total movement amount t is replaced with the value L indicating the advancement end position of the movable cover 28, and in step 270, the movable cover 28 is advanced to the advancement end. Subsequently, the processing moves to step 274.

When the value obtained through subtraction of the total movement amount t from the value L indicating the advancement end position of the movable cover 28 is not smaller than zero, the processing proceeds to step 272 in order to move the movable cover 28 by the movement amount ΔA and then proceeds to step 274.

In step 274, a judgment is made as to whether the spindle head 20 has reached a designated position. When the spindle head 20 has reached the designated position, the processing for moving the movable cover 28 is ended, and the processing proceeds to step 224 in FIG. 14. When the spindle head 20 has not reached the designated position, the processing returns to step 254 in order to repeat the processing from step 254 to step 274 until the spindle head 20 reaches the designated position.

As described, through repetition of the processing from step 254 to step 274, the movable cover 28 can be moved in an interlocked manner with the movement of the spindle head 20. Therefore, the distance between the movable cover 28 and the outer circumference of the workpiece W can be maintained constant, so that chips can be sucked under most efficient conditions, while interference with the workpiece W is avoided.

In the present embodiment, the spindle head 20 is advanced and retracted with respect to the workpiece W. However, the workpiece W may be advanced and retracted with respect to the spindle head 20 which is fixedly disposed on the base.

Suction of-chips by means of the chip suction apparatuses 30 and 64 is performed while the spindle head 20 is moved at a rapid feed rate or a cutting feed rate.

The chip suction apparatus 30 sucks air within the movable cover 28 in order to suck chips located in the vicinity of the tool T into the movable cover 28. The thus-sucked chips are transported to the dust collector 32 via the interior of the chip suction apparatus 30 and the flexible pipe 31. Thus, the chips are collected in the dust collector 32.

The chip suction apparatus 64 sucks chips that have fallen down and transports the sucked chips to the dust collector 32 in the same manner as in the case of the chip suction apparatus 30, so that the chips are collected in the dust collector 32.

The chips collected in the dust collector 32 accumulate in the chip pool section 161, while air used for suction of the chips is caused to pass through the filter 190 and is then released to the atmosphere via the air duct 176. When the air passes through the air duct 176, the air absorbs heat at the surface of the fin 177 and discharges the heat to the atmosphere. Thus, air inside the control box 173 is cooled.

This structure reduces the number of cooling devices for the control box 173, and in the case of a control box 173 which generates a relatively small amount of heat, the cooling devices can be eliminated in order to decrease the number of parts and the size of the control box.

Obviously, numerous modifications and variations of the present invention are possible in light of the above teachings. It is therefore to be understood that within the scope of the appended claims, the present invention may be practiced otherwise than as specifically described herein.

What is claimed is:

1. A horizontal machine tool comprising:
    a non-movably provided base having a top surface portion and an attachment portion extending from a front side of the base, said attachment portion comprising a vertical front face and having an upper surface lower than the top surface portion;
    a spindle head which supports a tool spindle to be rotatable about a horizontal axis perpendicular to a vertical plane including the vertical front face portion of said base;
    a first guide mechanism for guiding said spindle head such that said spindle head is movable in a first direction perpendicular to the axis of said tool spindle;
    a second guide mechanism for guiding said spindle head such that said spindle head is movable in a second direction parallel to the axis of said tool spindle;
    a first feed mechanism for feeding said spindle head in the first direction;
    a second feed mechanism for feeding said spindle head in the second direction;
    a workpiece support mounted directly to the vertical front face portion of said base and having a workpiece attachment portion at a position above the top surface portion of the base;
    a third guide mechanism for guiding said workpiece support on the vertical front face portion for movement in a third direction, which is a vertical direction perpendicular to the first and second direction; and a third feed mechanism for feeding said workpiece support in the third direction, whereby
said spindle head such that said spindle head is movable in the first and second directions intersecting perpendicularly in a horizontal plane, while said third guide mechanism guides said workpiece support such that said workpiece support is movable in the vertical third direction.

2. A horizontal machine tool according to claim 1, wherein
said third guide mechanism is disposed on the vertical front face portion of said base at the approximate longitudinal center of a guide portion that constitutes said first guide mechanism;
said second guide mechanism includes a pair of guide portions that are separated in the first direction and symmetrically disposed with respect to a vertical plane including the axis of said tool spindle; and
said third guide mechanism includes a pair of guide portions that are separated in the first direction and symmetrically disposed with respect to a vertical plane including the axis of said tool spindle when said spindle head is located at the approximate center of the guide portion of said first guide mechanism.

3. A horizontal machine tool according to claim 1, wherein said workpiece support comprises:
a support body which is guided by said third guide mechanism on the vertical front face portion to be moved in the vertical direction by said third feed mechanism;
a first index member supported at an upper portion of said support body such that said first index member is rotatable for indexing about a vertical axis;
a second index member supported on said first index member such that said second index member is rotatable for indexing about a horizontal axis perpendicular to the vertical axis, a workpiece being attached to said second index member;
a first index mechanism for rotating said first index member in order to index said first index member; and
a second index mechanism for rotating said second index member in order to index said second index member.

4. A horizontal machine tool according to claim 1, wherein
said vertical front face portion is formed on said base at the longitudinal center of the guide portion of said first guide mechanism;
an inclined portion is formed on at least one side of said vertical front face portion such that the inclined portion inclines downward from the top surface portion of said base toward the front side of said machine tool; and
a front member is removably attached to the front face of said base, said front member having an inclined portion corresponding to the inclined portion of said base in order to form a V-shaped chip collecting space on at least one side of said workpiece support in the first direction, so that the horizontal cross-sectional area of said chip collection space gradually decreases downward.

5. A workpiece-support feed mechanism for a horizontal machine tool in which a spindle head which supports a tool spindle to be rotatable about a horizontal axis is guided on a top surface of a non-movable base such that said spindle head is movable in a first horizontal direction perpendicular to the axis of said tool spindle and in a second horizontal direction parallel to the axis of said tool spindle, said workpiece-support feed mechanism comprising:
at least two bearing blocks fixed to a vertical front face portion of said base such that said bearing blocks are spaced in the first horizontal direction;
a pair of linear rails guided by said bearing blocks to be movable in a vertical direction;
a workpiece support body fixed to said linear rails and having at its upper end a cylindrical portion, a vertical plane including the attachment surface of said linear rails passing across the approximate center of said cylindrical portion;
a workpiece support mechanism provided on said workpiece support body; and
a vertical feed mechanism including a feed screw that extends vertically on the side opposite said bearing blocks with respect to said workpiece support body and that is adapted to vertically feed said workpiece support.

6. A horizontal machine tool according to claim 1, further including an automatic tool change apparatus which comprises:
a tool change arm unit including an arm shaft supported by a housing, a tool change arm attached to one end of said arm shaft projecting from said housing and having a tool gripping portion at either end, and a drive mechanism disposed within said housing and adapted to rotate and axially move said arm shaft;
a tool magazine for storing a plurality of tools such that the tools can be taken out from said tool magazine; and
an intermediate transport unit for transporting a selected tool from said tool magazine to a tool change position where said tool change arm can grip the tool, as well as for receiving a tool that has been removed from said tool spindle by said tool change arm and returning the tool to said tool magazine, wherein
said tool change arm unit is disposed such that said arm shaft becomes parallel to said tool spindle and that said housing is located on the front side of said tool spindle of said spindle head located at the tool change position.

7. A horizontal machine tool according to claim 6, wherein said too change arm unit is fixedly disposed on said base such that said housing of said tool change arm unit becomes parallel to said workpiece support.

8. A horizontal machine tool according to claim 7, wherein said tool change arm unit and said tool magazine are disposed on the front side of said tool spindle and parallel to said workpiece support on one side thereof in the first direction.

9. A horizontal machine tool according to claim 6, wherein
said tool magazine has a plurality of tool-holding portions for holding a plurality of tools such that the tools are parallel to and oriented in the same direction as a tool attached to said tool spindle;
each of said tool-holding portions being capable of receiving a tool from the front side of said machine tool and allowing the tool to be taken out to the back side of said tool-holding portion, while passing over said tool-holding portion; and
said intermediate transport unit being constructed such as to take out a tool from said tool-holding portion from the back side thereof in order to transfer the tool to the tool change position where said tool change arm can grip the tool and to return a tool that has been received by said tool change arm to said tool-holding portion from the back side thereof such that the tool is held at said tool-holding portion.

10. A horizontal machine tool according to claim 9, wherein said intermediate transport unit comprises:
- an intermediate transport socket capable of removably holding a tool in the same manner as in the case where a tool is held in said tool spindle;
- a front/back positioning mechanism for moving said intermediate transport socket in a horizontal direction parallel to the axis of said tool spindle;
- a vertical positioning mechanism for moving said front/back positioning mechanism in the vertical direction; and
- a transverse positioning mechanism for moving said vertical positioning mechanism in a horizontal direction perpendicular to the axis of said tool spindle,
- wherein said transverse positioning mechanism and said vertical positioning mechanism operate in a coordinated manner in order to align said intermediate transport socket with a desired tool on said tool magazine; and said front/back positioning mechanism operates in order to cause said intermediate transport socket to hold the tool aligned therewith and to transfer the held tool to a rotational plane of said tool change arm.

11. A horizontal machine tool according to claim 6, wherein
- said automatic tool change apparatus further comprises a substrate which is removably attached to said base;
- said base supports said tool change arm unit, said tool magazine, and said intermediate transport unit; and
- said tool change arm unit, said tool magazine, and said intermediate transport unit are removably attached to said machine tool as a single unit through an operation of fixing said substrate to said base while maintaining a posture of said substrate such that said arm shaft of said tool change arm and said plurality of tools on said tool magazine become parallel to said tool spindle.

12. A horizontal machine tool according to claim 4, wherein a chip suction port is formed in the vicinity of a bottom portion of said chip collecting space whose horizontal cross-sectional area gradually decreases downward; a chip suction apparatus is provided at said chip suction port in order suck chips by action of air; and a chip collection bin is provided in order to collect the chips sucked by said chip suction apparatus.

13. A horizontal machine tool according to claim 12, further comprising:
- a movable cover which is attached to said spindle head in order to cover said tool spindle and is movable in the advancement/retraction direction of said spindle head;
- movable cover control means for controlling movement of said movable cover based on the amount of movement of said spindle head in the advancement/retraction direction; and
- a chip suction apparatus for sucking chips within said movable cover.

14. A horizontal machine tool according to claim 13, wherein said chip suction apparatus for sucking chips within said movable cover and said chip suction apparatus for sucking chips within said chip collecting space share a common chip collection bin.

15. A horizontal machine tool according to claim 13, wherein, during machining of a workpiece, said movable cover control means controls the movement of said movable cover such that a predetermined clearance is maintained between said movable cover and a front face of the workpiece regardless of the length of a tool held in said tool spindle and movement of said spindle head in the advancement/retraction direction, whereby said movable cover is moved to a withdrawn position at the time of tool change operation.

16. A horizontal machine tool according to claim 12, further comprising:
- a motor for advancing and retracting said spindle head;
- a servo amplifier for controlling said motor; and
- a control box for accommodating said servo amplifier, wherein
  - said chip collection bin separates air from sucked chips in order to collect the chips and has an air discharge passage for discharging air to the outside;
  - said control box is provided in the vicinity of said air discharge passage; and
  - a heat exchange member is provided in said air discharge passage in order to transfer heat from the interior of said control box to said air discharge passage.

* * * * *

UNITED STATES PATENT AND TRADEMARK OFFICE
CERTIFICATE OF CORRECTION

PATENT NO. : 6,190,294
DATED : February 20, 2001
INVENTOR(S) : Okada, et al.

It is certified that error appears in the above-identified patent and that said Letters Patent is hereby corrected as shown below:

On the title page, the CPA information has been omitted. It should read as follows:

--(45)    Date of Patent: *Feb. 20, 2001 --

--(*) Notice:    This patent issued on a continued prosecution application filed under 36 CFR 1.53(d), and is subject to the twenty year patent term provisions of 35 U.S.C. 154(a)(2). --

Signed and Sealed this

Fifth Day of June, 2001

*Attest:*

NICHOLAS P. GODICI

*Attesting Officer*

*Acting Director of the United States Patent and Trademark Office*